US008872807B2

(12) United States Patent
Hosaka et al.

(10) Patent No.: US 8,872,807 B2
(45) Date of Patent: *Oct. 28, 2014

(54) VIDEO PROCESSING CIRCUIT, VIDEO PROCESSING METHOD, LIQUID CRYSTAL DISPLAY DEVICE, AND ELECTRONIC APPARATUS

(75) Inventors: Hiroyuki Hosaka, Matsumoto (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 874 days.

This patent is subject to a terminal disclaimer.

(21) Appl. No.: 13/030,767

(22) Filed: Feb. 18, 2011

(65) Prior Publication Data

US 2011/0205440 A1 Aug. 25, 2011

(30) Foreign Application Priority Data

Feb. 25, 2010 (JP) ................................ 2010-040926

(51) Int. Cl.

*G06F 3/038* (2013.01)
*G09G 5/00* (2006.01)
*G09G 3/36* (2006.01)

(52) U.S. Cl.

CPC ...... *G09G 3/3648* (2013.01); *G09G 2300/0447* (2013.01); *G09G 2300/0876* (2013.01); *G09G 2320/103* (2013.01); *G09G 2360/16* (2013.01)
USPC .......................................... 345/204; 345/690

(58) Field of Classification Search

None
See application file for complete search history.

(56) References Cited

U.S. PATENT DOCUMENTS

| | | | | |
|---|---|---|---|---|
| 6,226,058 | B1 * | 5/2001 | Ohi | 349/38 |
| 6,476,590 | B2 | 11/2002 | Chou | |
| 7,446,824 | B2 | 11/2008 | Kobayashi et al. | |
| 7,952,556 | B2 | 5/2011 | Honbo | |
| 8,081,284 | B2 * | 12/2011 | Hosaka et al. | 349/149 |
| 8,411,004 | B2 | 4/2013 | Iisaka et al. | |
| 8,466,866 | B2 | 6/2013 | Iisaka et al. | |
| 2008/0018630 | A1 * | 1/2008 | Fujino | 345/205 |
| 2008/0180385 | A1 * | 7/2008 | Yoshida et al. | 345/102 |
| 2009/0243983 | A1 * | 10/2009 | Ohashi et al. | 345/89 |
| 2011/0051006 | A1 | 3/2011 | Iisaka et al. | |
| 2011/0051007 | A1 | 3/2011 | Hosaka et al. | |
| 2011/0058111 | A1 | 3/2011 | Hosaka et al. | |
| 2011/0176071 | A1 | 7/2011 | Iisaka et al. | |

(Continued)

FOREIGN PATENT DOCUMENTS

| | | |
|---|---|---|
| CN | 102169679 A | 8/2011 |
| JP | A-6-34965 | 2/1994 |

(Continued)

*Primary Examiner* — Amare Mengistu
*Assistant Examiner* — Antonio Xavier
(74) *Attorney, Agent, or Firm* — Oliff PLC

(57) ABSTRACT

A video processing circuit used in a liquid crystal panel, includes: a first boundary detector that analyzes a video signal of a present frame to detect a boundary between a first pixel and a second pixel; a second boundary detector that analyzes a video signal of a frame one frame before the present frame to detect a boundary between the first pixel and the second pixel; a third boundary detector that detects a risk boundary that is determined by a tilt azimuth of the liquid crystal; and a correction portion that corrects an applied voltage to a liquid crystal device corresponding to a first pixel from the applied voltage to a liquid crystal device corresponding to the first pixel to a third voltage or higher, when the applied voltage specified by the video signal input to the first pixel is lower than the third voltage.

7 Claims, 24 Drawing Sheets

(56) References Cited

U.S. PATENT DOCUMENTS

| | | | | |
|---|---|---|---|---|
| 2011/0181795 | A1* | 7/2011 | Hosaka et al. | 348/790 |
| 2011/0205207 | A1 | 8/2011 | Hosaka et al. | |
| 2011/0205208 | A1 | 8/2011 | Iisaka et al. | |
| 2011/0205440 | A1 | 8/2011 | Hosaka et al. | |
| 2011/0205452 | A1* | 8/2011 | Hosaka et al. | 348/790 |
| 2011/0205479 | A1* | 8/2011 | Hosaka et al. | 349/149 |
| 2012/0147272 | A1* | 6/2012 | Hosaka et al. | 348/607 |
| 2013/0241914 | A1* | 9/2013 | Kitagawa et al. | 345/212 |

FOREIGN PATENT DOCUMENTS

| | | |
|---|---|---|
| JP | A-2009-69608 | 4/2009 |
| JP | A-2011-053390 | 3/2011 |
| JP | A-2011-053417 | 3/2011 |
| JP | A-2011-059160 | 3/2011 |
| JP | A-2011-145501 | 7/2011 |

* cited by examiner

SCANNING LINE DRIVE CIRCUIT

VIDEO PROCESSING CIRCUIT

VA

CORRECTION PROCESS
(ONE PIXEL ON LOW POTENTIAL SIDE; θb=45°)

CORRECTION PROCESS
(ONE PIXEL ON LOW POTENTIAL SIDE; θb=90°)

CORRECTION PROCESS
(ONE PIXEL ON LOW POTENTIAL SIDE; θb=225°)

FIG. 16A CORRECTION PROCESS (THREE PIXELS ON LOW POTENTIAL SIDE; θb=45°)
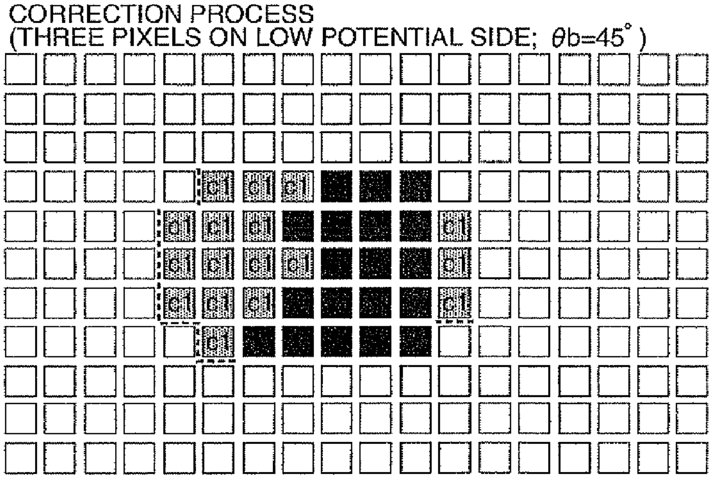
FIG. 16B CORRECTION PROCESS (THREE PIXELS ON LOW POTENTIAL SIDE; θb=90°)
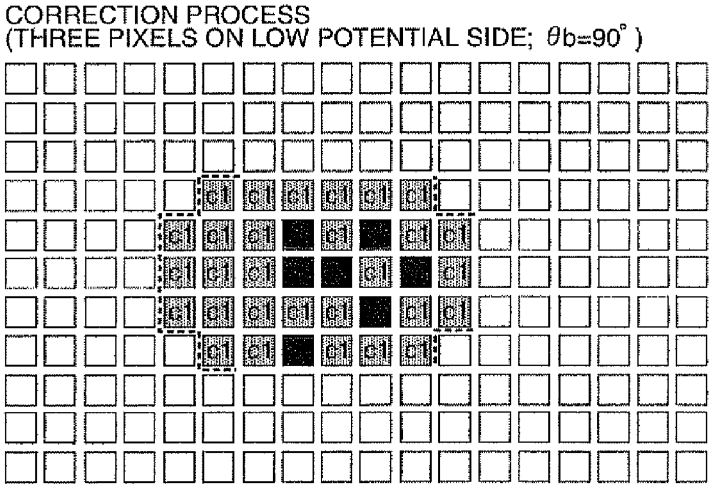
FIG. 16C CORRECTION PROCESS (THREE PIXELS ON LOW POTENTIAL SIDE; θb=225°)
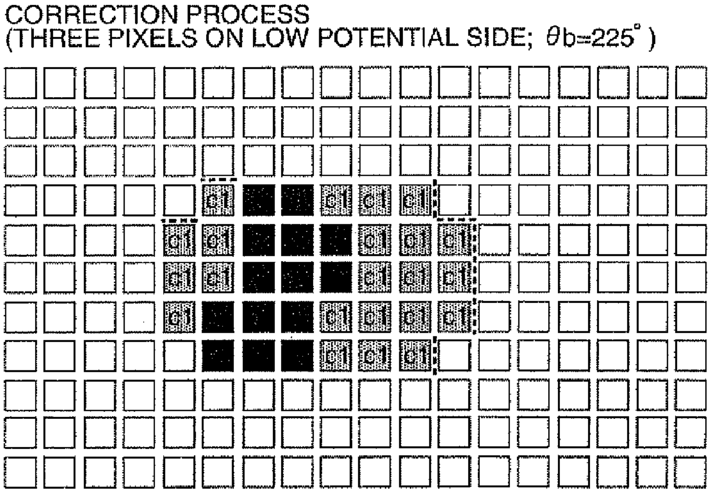

CORRECTION PROCESS
(ONE PIXEL ON HIGH POTENTIAL SIDE; θb=45°)

CORRECTION PROCESS
(ONE PIXEL ON HIGH POTENTIAL SIDE; θb=90°)

CORRECTION PROCESS
(ONE PIXEL ON HIGH POTENTIAL SIDE; θb=225°)

CORRECTION PROCESS
(THREE PIXELS ON HIGH POTENTIAL SIDE; θb=45°)

CORRECTION PROCESS
(THREE PIXELS ON HIGH POTENTIAL SIDE; θb=90°)

CORRECTION PROCESS
(THREE PIXELS ON HIGH POTENTIAL SIDE; θb=225°)

CORRECTION PROCESS (ONE PIXEL ON LOW POTENTIAL SIDE +ONE PIXEL ON HIGH POTENTIAL SIDE; $\theta b=45°$)

CORRECTION PROCESS (ONE PIXEL ON LOW POTENTIAL SIDE +ONE PIXEL ON HIGH POTENTIAL SIDE; $\theta b=90°$)

CORRECTION PROCESS (ONE PIXEL ON LOW POTENTIAL SIDE +ONE PIXEL ON HIGH POTENTIAL SIDE; $\theta b=225°$)

FIG. 21A CORRECTION PROCESS (TWO PIXELS ON LOW POTENTIAL SIDE +TWO PIXELS ON HIGH POTENTIAL SIDE; θb=45°)
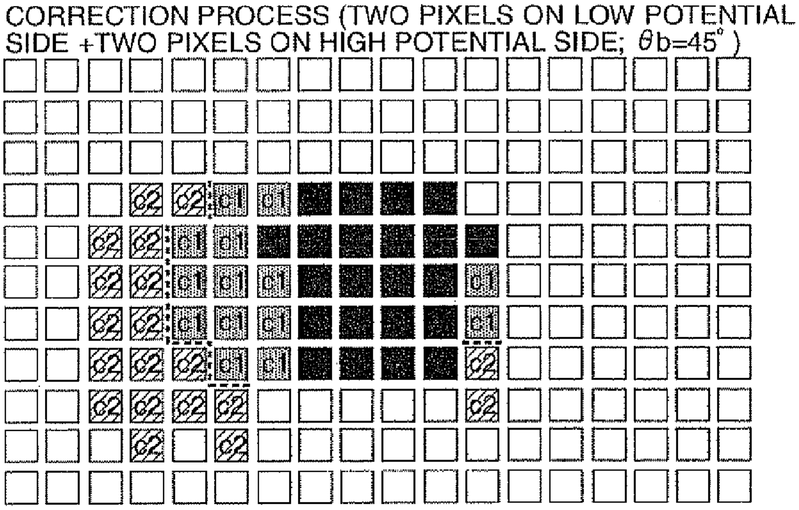
FIG. 21B CORRECTION PROCESS (TWO PIXELS ON LOW POTENTIAL SIDE +TWO PIXELS ON HIGH POTENTIAL SIDE; θb=90°)
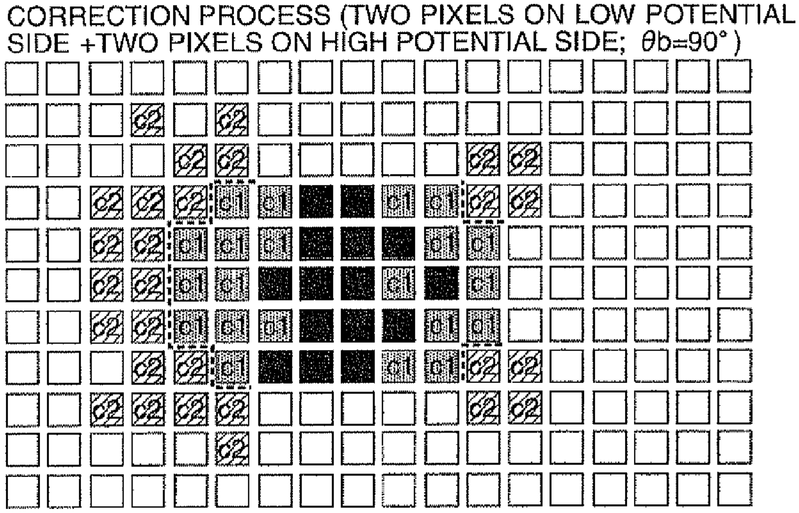
FIG. 21C CORRECTION PROCESS (TWO PIXELS ON LOW POTENTIAL SIDE +TWO PIXELS ON HIGH POTENTIAL SIDE; θb=225°)
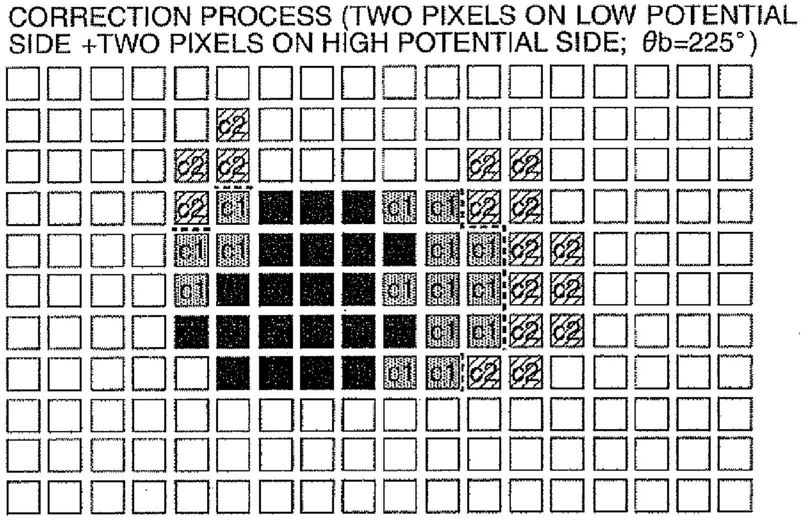

VIDEO PROCESSING CIRCUIT, VIDEO PROCESSING METHOD, LIQUID CRYSTAL DISPLAY DEVICE, AND ELECTRONIC APPARATUS

BACKGROUND

1. Technical Field

The present invention relates to a technique of reducing display defects in a liquid crystal panel.

2. Related Art

A liquid crystal panel is configured such that a liquid crystal is interposed between a pair of substrates held with a predetermined gap therebetween. Specifically, the liquid crystal panel has a configuration in which pixel electrodes are arranged in a matrix form for each pixel on one substrate, a common electrode is provided on the other substrate so as to be shared by the respective pixels, and the liquid crystal is interposed between the pixel electrodes and the common electrode. When a voltage corresponding to a gradation level is applied and held between the pixel electrode and the common electrode, the alignment state of the liquid crystal is defined for each pixel, whereby transmittance or reflectance is controlled. Therefore, in the configuration above, it can be said that among the electric field acting on the liquid crystal molecules, only a component in the direction (or the opposite direction) from the pixel electrode towards the common electrode, namely in the direction perpendicular (vertical) to the substrate surface contributes to display control.

However, as the pixel pitch has narrowed with further miniaturization and higher definition in recent years, the effect of an electric field which is generated between the adjacent pixel electrodes, namely an electric field in the direction parallel (horizontal) to the substrate surface has become unignorable. For example, when a horizontal electric field is applied to a liquid crystal that is designed to be driven by a vertical electric field such as in a VA (Vertical Alignment) or TN (Twisted Nematic)-mode liquid crystal, there is a problem in that alignment defects (namely, reverse tilt domain) occur in the liquid crystal, thus causing display defects.

Various proposals have been made in order to reduce the effect of reverse tilt domain. For example, JP-A-6-34965 discloses a new liquid crystal panel structure in which the shape of a light shielding layer (opening) is defined in conformity to the pixel electrode. Moreover, JP-A-2009-69608 discloses a technique in which determining that a reverse tilt domain occurs when an average luminance value calculated from a video signal is equal to or lower than a threshold value, video signals having a luminance value equal to or higher than a preset value are clipped away.

However, the technique of reducing the reverse tilt domain by devising a new liquid crystal panel structure has a drawback in that the aperture ratio is likely to decrease and it is difficult to apply the technique to a liquid crystal panel which is not manufactured in advance so as to have the new structure. On the other hand, the technique of clipping away the video signals having a luminance value equal to or higher than a preset value has a drawback in that the brightness of displayed images is limited to the preset value.

SUMMARY

An advantage of some aspects of the invention is that it provides a technique of reducing reverse tilt domain while solving these drawbacks.

According to an aspect of the invention, there is provided a video processing circuit used in a liquid crystal panel in which a liquid crystal is interposed between a first substrate on which a pixel electrode is provided so as to correspond to each of a plurality of pixels and a second substrate on which a common electrode is provided, and a liquid crystal device is formed of the pixel electrode, the liquid crystal, and the common electrode, the video processing circuit inputting video signals that specify an applied voltage to the liquid crystal device for each of the pixels and defining each of the applied voltages to the liquid crystal devices based on processed video signals, including: a first boundary detector that analyzes a video signal of a present frame to detect a boundary between a first pixel of which the applied voltage specified by the video signal is lower than a first voltage and a second pixel of which the applied voltage is equal to or higher than a second voltage higher than the first voltage; a second boundary detector that analyzes a video signal of a frame one frame before the present frame to detect a boundary between the first pixel and the second pixel; a third boundary detector that detects a portion of the boundary detected by the first boundary detector, which is changed from the boundary detected by the second boundary detector, as a risk boundary that is determined by a tilt azimuth of the liquid crystal; and a correction portion that corrects an applied voltage to a liquid crystal device corresponding to a first pixel which is adjacent to the risk boundary detected by the third boundary detector from the applied voltage to a liquid crystal device corresponding to the first pixel to a third voltage or higher, the third voltage lower than the first voltage, when the applied voltage specified by the video signal input to the first pixel is lower than the third voltage. According to this configuration, since it is not necessary to apply changes to the structure of a liquid crystal panel, the aperture ratio will not decrease, and the invention can be applied to a liquid crystal panel which is not manufactured in advance so as to have a new structure. Moreover, since the applied voltage to a liquid crystal device corresponding to a second pixel among the pixels adjacent to the boundary is corrected from the value corresponding to the gradation level specified by the video signal to the third voltage or higher, the brightness of a displayed image is not limited to a preset value.

In the video processing circuit, it is preferable that the correction portion corrects the applied voltages to liquid crystal devices corresponding to the first pixel adjacent to the risk boundary and one or more first pixels continuous to the first pixel from the applied voltage specified by the video signal to the third voltage or higher. Moreover, it is preferable that, when a refresh time interval of the display of the liquid crystal panel is S and a response time of the liquid crystal device when the applied voltage is changed from a voltage lower than the third voltage to the voltage corrected by the correction portion is T1, if $S<T1$, the number of first pixels of which the applied voltage is to be corrected is determined by the value of an integer part of a division of the response time T1 by the time interval S. According to this configuration, it is possible to prevent the occurrence of reverse tilt domain even when the response time of a liquid crystal device is longer than the refresh time interval of the display screen. Specifically, when the refresh time interval of the display of the liquid crystal panel is S and the response time of the liquid crystal device when the applied voltage is changed to the correction voltage is T1, if $S<T1$, the number of first pixels of which the applied voltage is to be corrected may be determined by the value of an integer part of a division of the response time T1 by the time interval S.

According to another aspect of the invention, there is provided a video processing circuit used in a liquid crystal panel in which a liquid crystal is interposed between a first substrate on which a pixel electrode is provided so as to correspond to each of a plurality of pixels and a second substrate on which a common electrode is provided, and a liquid crystal device is formed of the pixel electrode, the liquid crystal, and the common electrode, the video processing circuit inputting video signals that specify an applied voltage to the liquid crystal device for each of the pixels and defining each of the applied voltages to the liquid crystal devices based on processed video signals, including: a first boundary detector that analyzes a video signal of a present frame to detect a boundary between a first pixel of which the applied voltage specified by the video signal is lower than a first voltage and a second pixel of which the applied voltage is equal to or higher than a second voltage higher than the first voltage; a second boundary detector that analyzes a video signal of a frame one frame before the present frame to detect a boundary between the first pixel and the second pixel; a third boundary detector that detects a portion of the boundary detected by the first boundary detector, which is changed from the boundary detected by the second boundary detector, as a risk boundary that is determined by a tilt azimuth of the liquid crystal; and a correction portion that corrects an applied voltage to a liquid crystal device corresponding to a second pixel which is adjacent to the risk boundary detected by the third boundary detector from the applied voltage to a liquid crystal device corresponding to the second pixel to a voltage lower than the second voltage and higher than the first voltage when the applied voltage specified by the video signal input to the second pixel is higher than the second voltage. According to this configuration, since it is not necessary to apply changes to the structure of a liquid crystal panel, the aperture ratio will not decrease, and the invention can be applied to a liquid crystal panel which is not manufactured in advance so as to have a new structure. Moreover, since the applied voltage to a liquid crystal device corresponding to a first pixel among the pixels adjacent to the boundary is corrected from the value corresponding to the gradation level specified by the video signal, the brightness of a displayed image is not limited to a preset value.

In the video processing circuit, it is preferable that the correction portion corrects the applied voltages to liquid crystal devices corresponding to the second pixel adjacent to the risk boundary and one or more second pixels continuous to the second pixel from the applied voltage specified by the video signal to a voltage lower than the second voltage and higher than the first voltage. It is also preferable that, when a refresh time interval of the display of the liquid crystal panel is S and a response time of the liquid crystal device when the applied voltage is changed from a voltage higher than the second voltage to the voltage corrected by the correction portion is TI, if S<T1, the number of second pixels of which the applied voltage is to be corrected is determined by the value of an integer part of a division of the response time T1 by the time interval S. According to this configuration, it is possible to prevent the occurrence of reverse tilt domain even when the response time of a liquid crystal device is longer than the refresh time interval of the display screen. Specifically, when the refresh time interval of the display of the liquid crystal panel is S and the response time of the liquid crystal device when the applied voltage is changed to the correction voltage is T, if S<T, the number of second pixels of which the applied voltage is to be corrected may be determined by the value of an integer part of a division of the response time T by the time interval S.

In the video processing circuit, it is preferable that the correction portion corrects an applied voltage to a liquid crystal device corresponding to a first pixel which is adjacent to the risk boundary from the applied voltage specified by the input video signal to a voltage equal to or higher than the third voltage and lower than the second voltage when the applied voltage specified by the video signal input to the first pixel is lower than the third voltage lower than the first voltage. With this configuration, the difference in the applied voltage between the adjacent pixels is further decreased, and the occurrence of reverse tilt domain can be suppressed more effectively.

In the video processing circuit, it is preferable that the correction portion corrects the applied voltages to liquid crystal devices corresponding to the first pixel adjacent to the risk boundary and one or more first pixels continuous to the first pixel from the applied voltage specified by the video signal to a voltage equal to or higher than the third voltage and lower than the second voltage. It is also preferable that, when a refresh time interval of the display of the liquid crystal panel is S and a response time of the liquid crystal device when the applied voltages to the liquid crystal devices corresponding to the first pixels are changed from a voltage lower than the third voltage to the voltage corrected by the correction portion is T2, if S<T2, the number of first pixels of which the applied voltage is to be corrected is determined by the value of an integer part of a division of the response time T2 by the time interval S. With this configuration, the difference in the applied voltage between the adjacent pixels is further decreased, and the occurrence of reverse tilt domain can be suppressed more effectively. Moreover, it is possible to prevent the occurrence of reverse tilt domain even when the response time of a liquid crystal device is longer than the refresh time interval of the display screen.

In the video processing circuit, it is preferable that the correction portion corrects the applied voltage to the liquid crystal device corresponding to the first pixel subjected to the correction to a voltage that gives an initial tilt angle to the liquid crystal device. According to this configuration, it is possible to suppress the liquid crystal molecules from entering a reverse tilt state while suppressing a change in the transmittance of a dark pixel.

In the video processing circuit, it is preferable that the tilt azimuth is a direction from one end of the long axis of a liquid crystal molecule on the pixel electrode side to the other end of the liquid crystal molecule as viewed in plan view from the pixel electrode side towards the common electrode. This is because the reverse tilt domain is caused by the horizontal electric field generated between the pixel electrodes.

The invention can be embodied as a video processing method, a liquid crystal display device, and an electronic apparatus having the liquid crystal display device, in addition to the video processing circuit.

BRIEF DESCRIPTION OF THE DRAWINGS

The invention will be described with reference to the accompanying drawings, wherein like numbers reference like elements.

FIGS. 16A to 16C show a correction process in a video processing circuit according to a second embodiment of the invention.

FIGS. 21A to 21C show a correction process in a video processing circuit according to a sixth embodiment of the invention.

DESCRIPTION OF EXEMPLARY EMBODIMENTS

First Embodiment

First, a first embodiment of the invention will be described.

Figure 1:
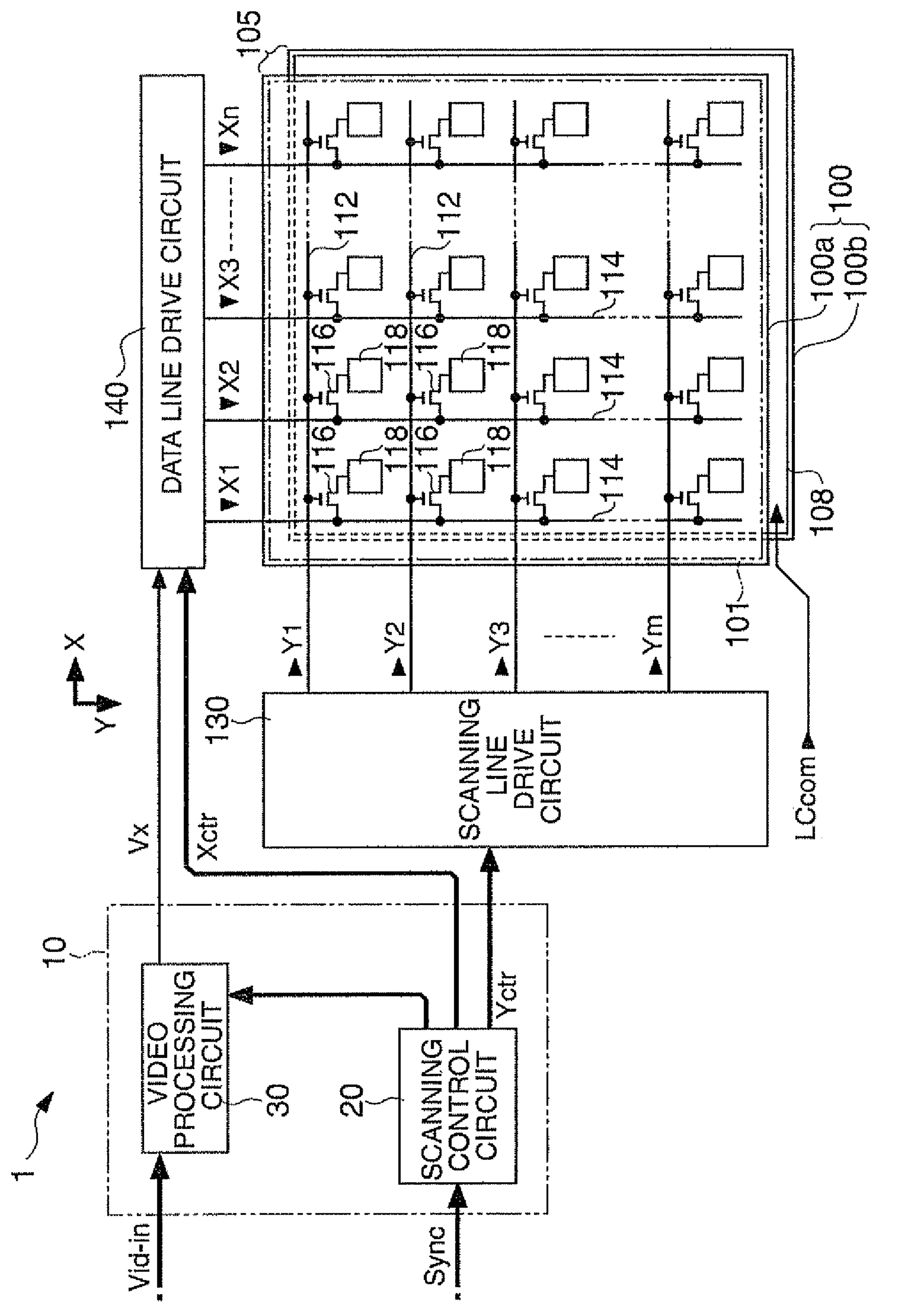
FIG. 1 shows a liquid crystal display device having a video processing circuit according to a first embodiment of the invention.

FIG. 1 is a block diagram showing an overall configuration of a liquid crystal display device having a video processing circuit according to this embodiment, As shown in FIG. 1, a liquid crystal display device 1 includes a control circuit 10, a liquid crystal panel 100, a scanning line drive circuit 130, and a data line drive circuit 140. A video signal Vid-in is supplied from a high-order device to the control circuit 10 in synchronization with a synchronization signal Sync. The video signal Vid-in is digital data that specifies the gradation levels of the respective pixels in the liquid crystal panel 100 and is supplied in the scanning order based on the vertical/horizontal scanning signals and dot clock signal (not shown) included in the synchronization signal Sync.

Although the video signal Vid-in specifies the gradation level, since the applied voltage to a liquid crystal device is determined by the gradation level, the video signal Vid-in can be said to specify the applied voltage to the liquid crystal device.

The control circuit 10 includes a scanning control circuit 20 and a video processing circuit 30. The scanning control circuit 20 generates various control signals and controls each unit in synchronization with the synchronization signal Sync. The video processing circuit 30 processes the digital video signal Vid-in to output an analog data signal Vx, and details of which will be described later.

The liquid crystal panel 100 has ba configuration in which a device substrate (first substrate) 100*a* and a counter substrate (second substrate) 100*b* are bonded together with a predetermined gap therebetween, and a liquid crystal 105 that is driven by a vertical electric field is interposed in that gap. On a surface of the device substrate 100*a* facing the counter substrate 100*b*, a plurality (m) of rows of scanning lines 112 is provided along the X (horizontal) direction in the drawing. In addition, a plurality (n) of columns of data lines 114 is provided along the Y (vertical) direction so as to be electrically insulated from the respective scanning lines 112.

In this embodiment, in order to distinguish between the scanning lines 112, they are sometimes referred to as scanning lines on the first, second, third, . . . , (m−1)-th, and m-th rows from top to down in the drawing. Similarly, in order to distinguish between the data lines 114, they are sometimes referred to as data lines on the first, second, third, . . . , (n−1)-th, and n-th columns from left to right in the drawing.

On the device substrate 100*a*, an n-channel TFT 116 and a rectangular transparent pixel electrode 118 are further provided in pair so as to correspond to each intersection between the scanning lines 112 and the data lines 114. The TFT 116 has a gate electrode connected to the scanning line 112, a source electrode connected to the data line 114, and a drain electrode connected to the pixel electrode 118. On the other hand, on a surface of the counter substrate 100*b* facing the device substrate 100*a*, a transparent common electrode 108 is provided over the entire surface. A voltage LCcom is applied from a circuit (not shown) to the common electrode 108.

In FIG. 1, the facing surface of the device substrate 100*a* is on the rear side of the drawing sheet. Thus, although the scanning lines 112, data lines 114, TFTs 116, and pixel electrodes 118 provided on the facing surface should be depicted by broken lines, they are intentionally depicted by solid lines to make them easy to see.

Figure 2:
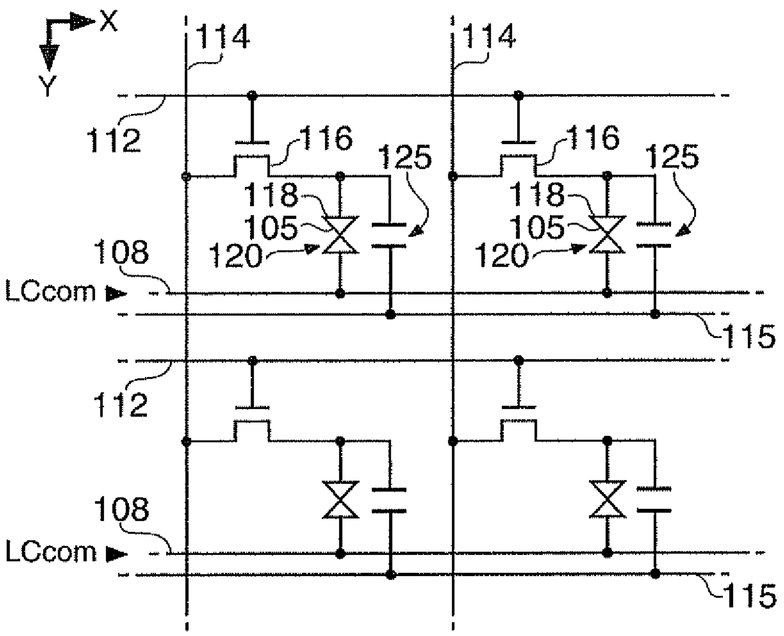
FIG. 2 shows an equivalent circuit of a liquid crystal device in the liquid crystal display device.

FIG. 2 shows an equivalent circuit of the liquid crystal panel 100.

As shown in FIG. 2, the liquid crystal panel 100 has a configuration in which liquid crystal devices 120 having the liquid crystal 105 interposed between the pixel electrode 118 and the common electrode 108 are arranged so as to correspond to intersections of the scanning lines 112 and the data lines 114. Although not shown in FIG. 1, in the equivalent circuit of the liquid crystal panel 100, actually, as shown in FIG. 2, an auxiliary capacitor (storage capacitor) 125 is provided in parallel to the liquid crystal device 120. The auxiliary capacitor 125 has one end connected to the pixel electrodes 118 and the other end connected in common to a capacitor line 115. The capacitor line 115 is held at a voltage that is constant at all times.

Here, when the scanning line 112 is in the H level, the TFTs 116 having the gate electrodes connected to the scanning line are turned ON, and the pixel electrodes 118 are connected to the data lines 114. Therefore, when the scanning line 112 is in the H level, and a data signal having a voltage corresponding to a gradation is supplied to the data lines 114, the data signal is applied to the pixel electrodes 118 through the TFTs 116 in the ON state. When the scanning line 112 is in the L level, the TFTs 116 are turned OFF, and the voltage applied to the pixel electrodes 118 is held by the capacitive auxiliary capacitors 125 of the liquid crystal device 120.

In the liquid crystal device 120, the alignment state of the molecules of the liquid crystal 105 is changed in accordance with an electric field generated by the pixel electrode 118 and the common electrode 108. Therefore, when the liquid crystal device 120 is a transmission-type liquid crystal device, the transmittance thereof changes with the applied and held voltage. In the liquid crystal panel 100, since the transmittance changes for each liquid crystal device 120, the liquid crystal device 120 corresponds to a pixel. Moreover, an arrangement region of the pixels forms a display region 101.

In this embodiment, it is assumed that the liquid crystal 105 operates in the VA mode, and the liquid crystal device 120 operates in the normally black mode wherein it appears black when no voltage is applied.

Figure 5A:
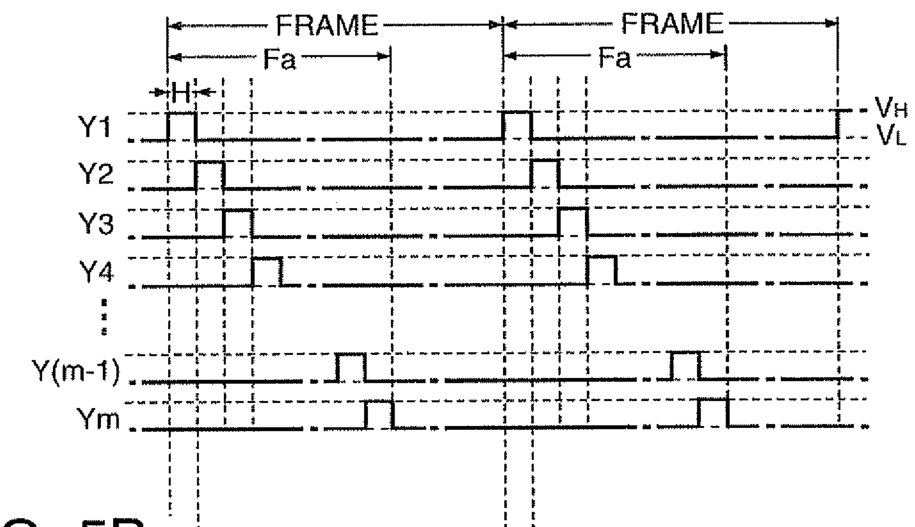
FIGS. 5A and 5B show a display operation in the liquid crystal panel.

The scanning line drive circuit 130 supplies scanning signals Y1, Y2, Y3, . . . , and Ym to the scanning lines 112 on the first, second, third, . . . , and m-th rows in accordance with a control signal Yctr from the scanning control circuit 20. Specifically, as shown in FIG. 5A, the scanning line drive circuit 130 sequentially selects the scanning lines 112 in the order of the first, second, third, . . . , (m−1)th, and m-th rows over one frame and puts the scanning signal to be supplied to the selected scanning line into a select voltage $V_H$ (H level) and the scanning signal to be supplied to the other scanning lines into a non-selective voltage $V_L$ (L level).

Here, the, frame refers to a period of time needed for one page of images to be displayed by the driving of the liquid crystal panel 100. If the frequency of a vertical scanning signal included in the synchronization signal Sync is 60 Hz, the frame corresponds to a period of 16.7 msec which is the inverse of that frequency.

The data line drive circuit 140 samples the data signal Vx supplied from the video processing circuit 30 in accordance with the control signal Xctr from the scanning control circuit 20 and outputs the sampled data signal to the data lines 114 on the first to nth columns as data signals X1 to Xn.

In this specification, with regard to all voltages except the applied voltage to the liquid crystal device 120, the ground potential (not shown) is used as the reference of a zero voltage unless stated otherwise. This is to distinguish the applied voltage to the liquid crystal device 120 from other voltages, and the applied voltage to the liquid crystal device 120 is a potential difference between the voltage LCcom of the common electrode 108 and the voltage of the pixel electrode 118.

Figure 4A:
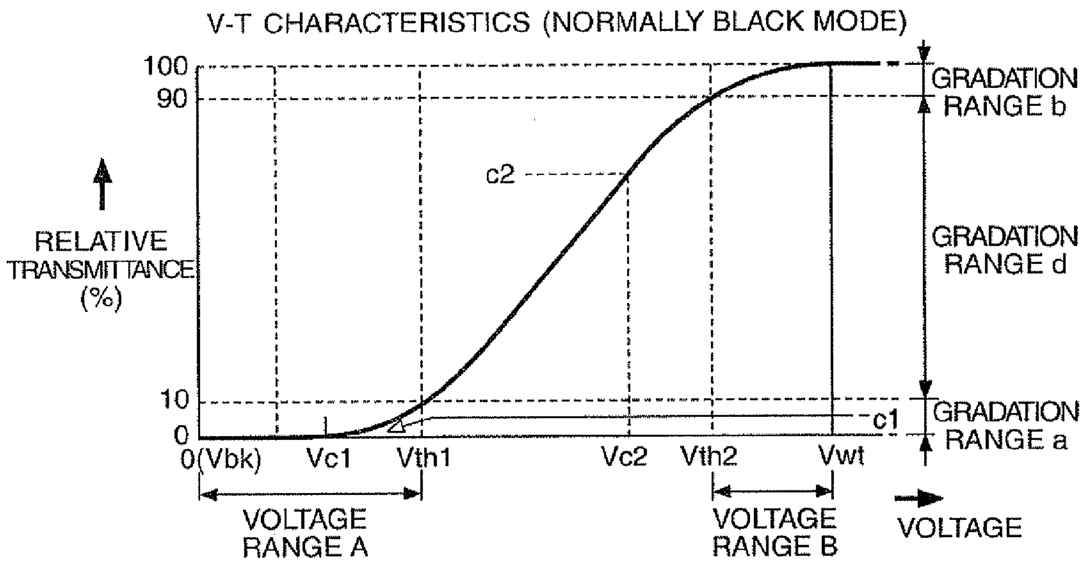
FIGS. 4A and 4B show V-T characteristics of a liquid crystal panel of the liquid crystal display device.

The relationship between the applied voltage and the transmittance of the liquid crystal device 120 of the normally black mode is represented by the V-T characteristics as shown in FIG. 4A, for example. Therefore, for the liquid crystal device 120 to have transmittance corresponding to a gradation level specified by the video signal Vid-in, it may be beneficial to apply a voltage corresponding to that gradation level to the liquid crystal device 120. However, if the applied voltage to the liquid crystal device 120 is defined by only the gradation level specified by the video signal Vid-in, display defects resulting from reverse tilt domain may occur.

Figure 26:
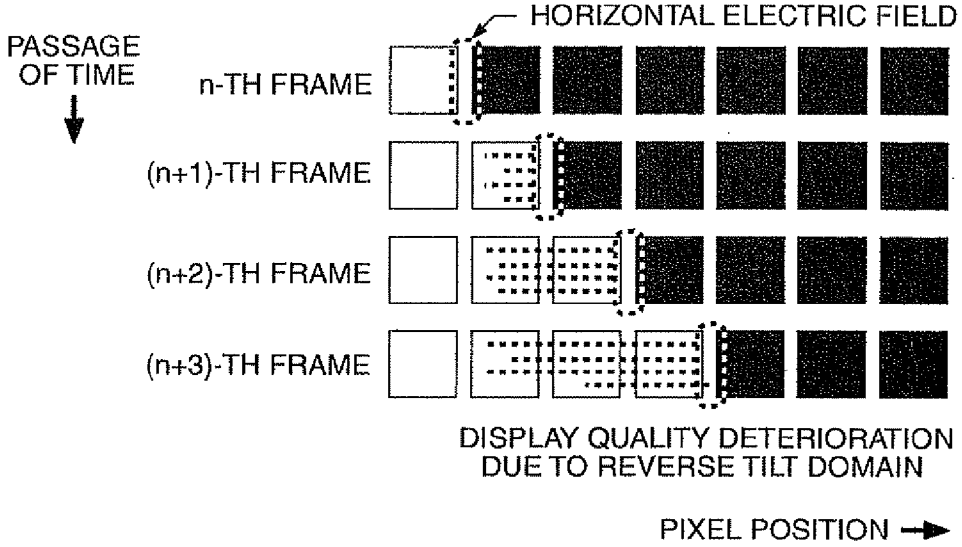
FIG. 26 shows display defects due to the effect of a horizontal electric field.

An example of display defects resulting from reverse tilt domain will be described. For example, as shown in FIG. 26, a case where the image represented by the video signal Vid-in is a black pattern which is made up of successive black pixels and which moves on the background white pixels in the rightward direction by a distance of one pixel for each frame will be considered. In this case, a kind of trailing phenomenon occurs. That is, a pixel which is at the left end (the trailing end of the movement) of the black pattern and which is to be changed from a black pixel to a white pixel does not appear as a white pixel due to the occurrence of reverse tilt domain.

However, such a trailing phenomenon does not occur (or is rarely visually recognizable) when the liquid crystal panel 100 is driven at the same speed as the supply speed of the video signal Vid-in like this embodiment, the black pixel region on the background white pixels moves by a distance of two pixels for each frame, and as will be described later, the response time of the liquid crystal device is shorter than the refresh time interval of a display screen. This is considered to be attributable to the following facts; that is, when a white pixel and a black pixel are adjacent in a certain frame, reverse tilt domain may occur in that white pixel. However, considering the movement of an image, since the pixels where reverse tilt domain occurs appear in a discrete manner, the reverse tilt domain is rarely visually perceived.

Looking at FIG. 26 from a different perspective, it can be said that when a white pattern made up of successive white pixels moves on the background black pixels in the rightward direction by a distance of one pixel for each frame, a pixel which is at the right end (the leading end of the movement) of the white pattern and which is to be changed from a black pixel to a white pixel does not appear as a white pixel due to the occurrence of reverse tilt domain.

In the drawing, in order to make the description easy to understand, pixels near the boundary within one line of the image have been extracted.

Such display defects resulting from reverse tilt domain are considered as one of the causes as to why it is difficult for the interposed liquid crystal molecules in the liquid crystal device 120 to have an alignment state corresponding to an applied voltage when the liquid crystal molecules being in an unstable state are disordered by the effect of a horizontal electric field.

Here, the case where the liquid crystal molecules are affected by the horizontal electric field is when the potential difference between the adjacent pixel electrodes increases, which is a case where dark pixels having a black level (or a level close to the black level) and bright pixels having a white level (or a level close to the white level) are adjacent in an image that is to be displayed.

Among these pixels, it is assumed that the dark pixels are the pixels of the liquid crystal device 120 in which the applied voltage is equal to or higher than a voltage Vbk corresponding to the black level in the normally black mode and is in a voltage range A lower than a threshold voltage Vth1 (first voltage). Moreover, for the sake of convenience, transmittance range (gradation range) of the liquid crystal device in which the applied voltage is in the voltage range A will be denoted as "a."

In addition, it is assumed that the bright pixels are the liquid crystal devices 120 in which the applied voltage is equal to or higher than a threshold voltage Vth2 (second voltage) and is in a voltage range B equal to or lower than a voltage Vwk corresponding to the white level in the normally black mode. Moreover, for the sake of convenience, a transmittance range (gradation range) of the liquid crystal device in which the applied voltage is in the voltage range B will be denoted as "b."

The case where the liquid crystal molecules are in the unstable state is when the applied voltage to the liquid crystal device is lower than Vc1 (third voltage) in the voltage range A. When the applied voltage to the liquid crystal device is lower than Vc1, since the alignment regulating force of the vertical electric field by the applied voltage is weaker than the alignment regulating force by the alignment film, the alignment state of the liquid crystal molecules is easily disordered even by a small external factor. Moreover, thereafter, even when the applied voltage reaches Vc1 or more, it may take a lot of response time for the liquid crystal molecules to be tilted with the applied voltage. In other words, when the applied voltage is equal to or higher than Vc1, it can be said that the alignment state of the liquid crystal molecules is in the stable state because the liquid crystal molecules begin to be tilted with the applied voltage (the transmittance begins to change). Therefore, the voltage Vc1 is set to be lower than the threshold voltage Vth1 which is defined by transmittance.

Given the above, the pixels of which the liquid crystal molecules were in the unstable state before the applied voltage changes can be said to be in a state where reverse tilt domain is likely to occur due to the effect of the horizontal electric field when dark pixels and bright pixels are made adjacent by the movement of an image. However, considering the initial alignment state of the liquid crystal molecules, there are cases where reverse tilt domain occurs or not depending on the positional relationship between the dark pixel and the bright pixel.

The respective cases will be discussed.

Figure 6A:
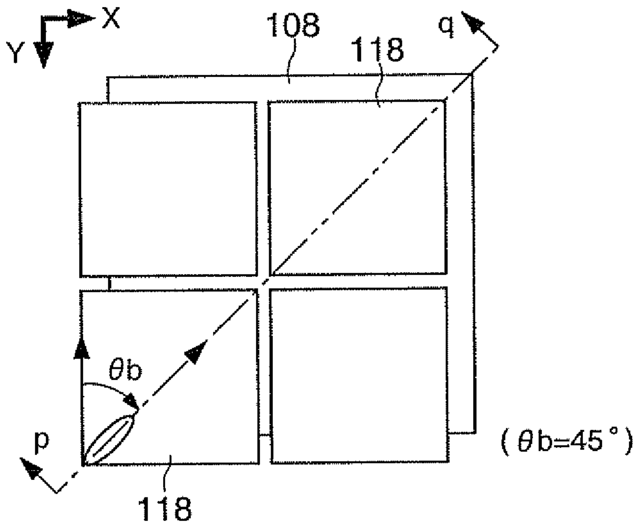
FIGS. 6A and 6B illustrate an initial alignment in the VA mode of the liquid crystal panel.
Figure 6B:
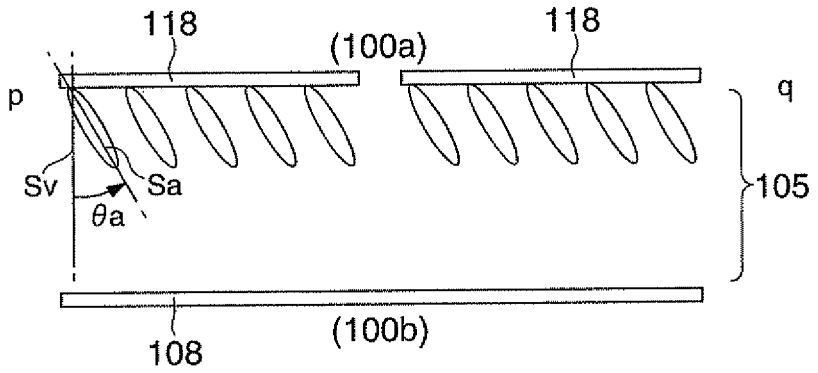

FIG. 6A shows 2×2 pixels adjacent in the vertical and horizontal directions in the liquid crystal panel 100, and FIG. 6B shows the liquid crystal panel 100 in a simplified cross-sectional view when cut along a vertical plane including the p-q line in FIG. 6A.

As shown in FIGS. 6A and 6B, it is assumed that in an initial alignment state, VA-mode liquid crystal molecules have a tilt angle of θa and a tilt azimuth angle of θb (=45°) in a state where the potential difference (the applied voltage to the liquid crystal device) between the pixel electrode 118 and the common electrode 108 is zero. Here, as described above, since reverse tilt domain occurs due to the horizontal electric field between the pixel electrodes 118, the behavior of the liquid crystal molecules on the side of the device substrate 100*a* where the pixel electrodes 118 are provided is important. Thus, the tilt azimuth angle and tilt angle of the liquid crystal molecules are defined with respect to the side of the pixel electrodes 118 (device substrate 100*a*).

Specifically, as shown in FIG. 6B, it is assumed that the tilt angle θa is an angle of the long axis Sa of a liquid crystal molecule with respect to the substrate normal Sv when one end of the long axis Sa of the liquid crystal molecule on the pixel electrode 118 side is fixed, and the other end on the common electrode 108 side is tilted.

On the other hand, it is assumed that the tilt azimuth angle θb is an angle of a substrate vertical plane (the vertical plane including the p-q line) including the long axis Sa of the liquid crystal molecule and the substrate normal Sv with respect to a substrate vertical plane taken along the Y direction, which is the arrangement direction of the data lines 114. Moreover, the tilt azimuth angle θb is defined as a clockwise angle from the top direction of the drawing (the opposite direction of the Y direction), as viewed in plan view from the side of the pixel electrode 118 towards the common electrode 108, to the direction (the top-right direction in FIG. 6A) from one end of the long axis of the liquid crystal molecule to the other end.

Moreover, the direction from one end of the liquid crystal molecule on the pixel electrode side to the other end, as viewed in plan view from the side of the pixel electrodes 118 will be appropriately referred to as the downstream side of the tilt azimuth. Conversely, the direction from the other end to one end (the bottom-left direction in FIG. 6A) will be appropriately referred to as the upstream side of the tilt azimuth.

Figures 7A, 7B, 7C:
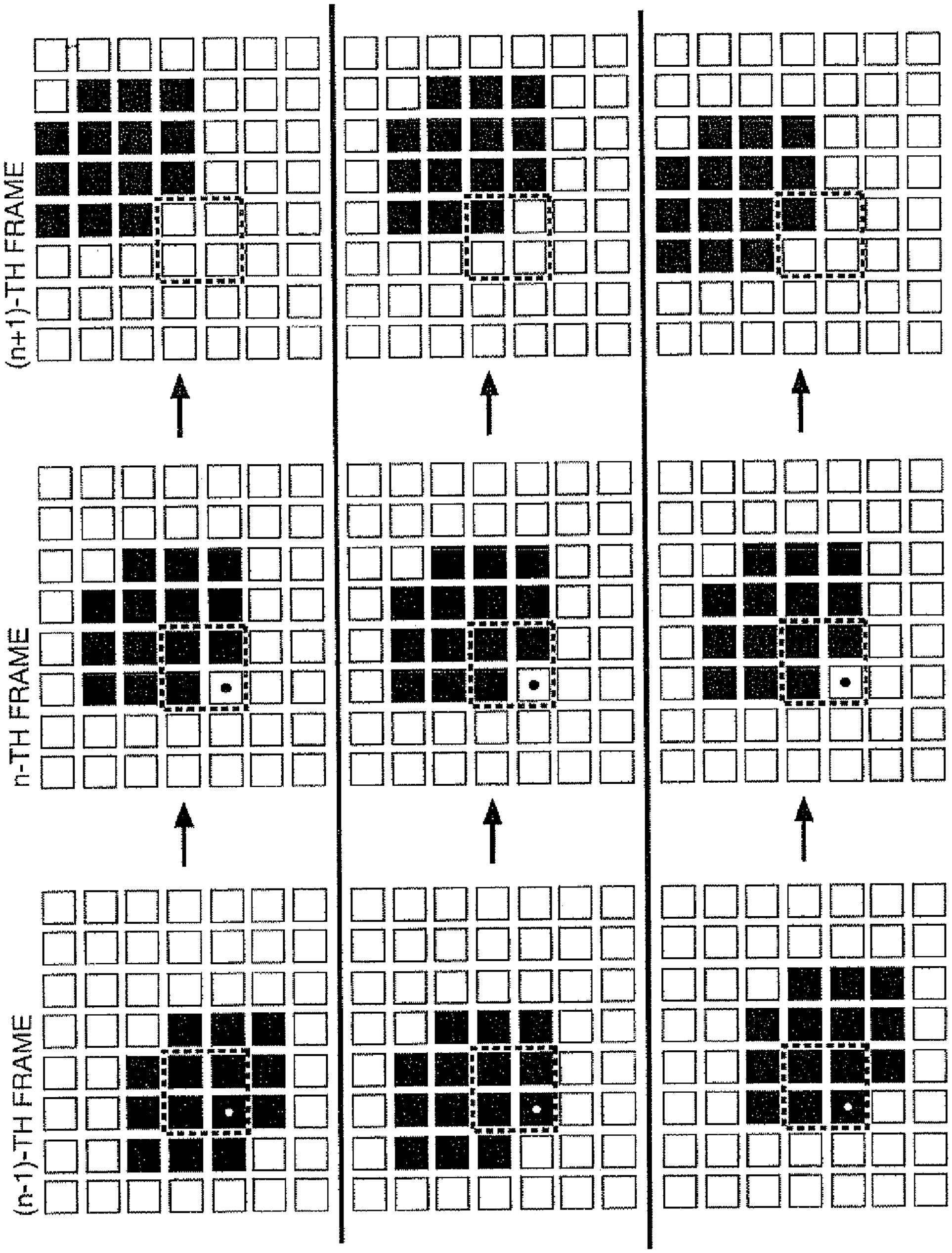
FIGS. 7A to 7C illustrate movement of an image in the liquid crystal panel.

Now, the four (2×2) pixels surrounded by a broken line, for example, as shown in FIG. 7A, in the liquid crystal panel 100 using the liquid crystal 105 that is in such an initial alignment will be focused on. FIG. 7A shows a case where a pattern made up of pixels (black pixels) having the black level moves on a background region made up of pixels (white pixels) having the white level in the top-right direction by a distance of one pixel for each frame.

Figure 8A:
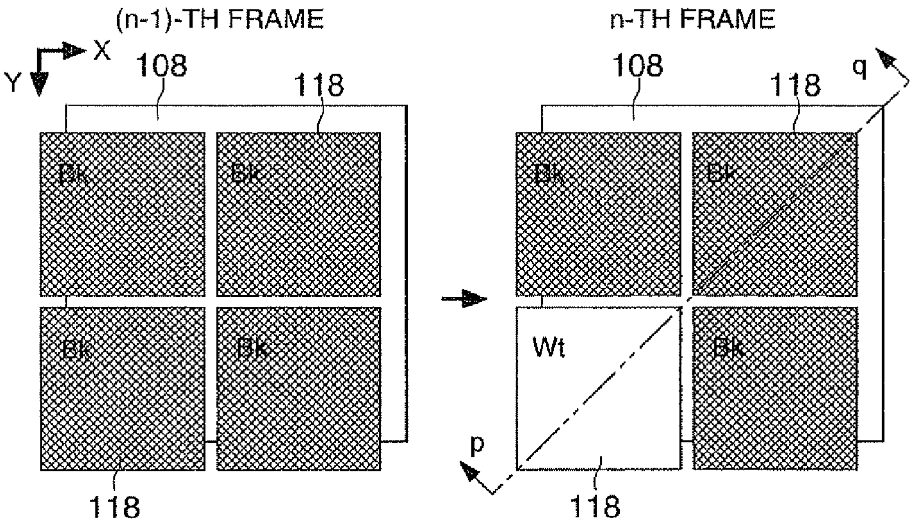
FIGS. 8A to 8C illustrate reverse tilt occurring in the liquid crystal panel.
Figure 8B:
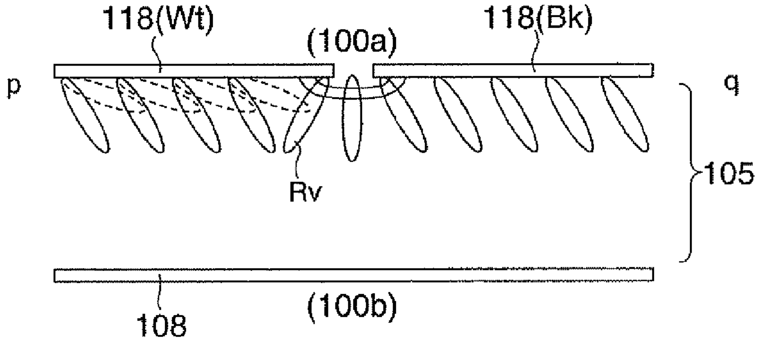

That is, a case in which the four (2×2) pixels transition from a state where all the four pixels are black pixels in the (n−1)-th frame to a state where only one pixel on the bottom-left is a white pixel in the n-th frame as shown in FIG. 8A will be considered. As described above, in the normally black mode, the applied voltage which is the potential difference between the pixel electrode 118 and the common electrode 108 is larger in the white pixel than in the black pixel. Therefore, in the pixel on the bottom-left which transitions from black to white, the liquid crystal molecules tend to be tilted in the direction (the direction horizontal to the substrate surface) vertical to the electric field direction from the state depicted by the solid line to the state depicted by the broken line as shown in FIG. 8B.

However, the potential difference generated between the pixel electrode 118 (Wt) of the white pixel and the pixel electrode 118 (Bk) of the black pixel is approximately equal to the potential difference generated between the pixel electrode 118 (Wt) of the white pixel and the common electrode 108. Moreover, the gap between the pixel electrodes is narrower than the gap between the pixel electrode 118 and the common electrode 108. Therefore, comparing the electric field intensities, the horizontal electric field generated between the pixel electrode 118 (Wt) and the pixel electrode 118 (Bk) is stronger than the vertical electric field generated between the pixel electrode 118 (Wt) and the common electrode 108.

Since the pixel on the bottom-left is the black pixel of which the liquid crystal molecules were in the unstable state in the (n−1)-th frame, it takes a lot of time for the liquid crystal molecules to be tilted in accordance with the intensity of the vertical electric field. On the other hand, the horizontal electric field from the adjacent pixel electrode 118 (Bk) is stronger than the vertical electric field generated when a voltage having the white level is applied to the pixel electrode 118 (Wt). Therefore, in a pixel that is going to transition to a white pixel, a liquid crystal molecule Rv close to an adjacent black pixel enters a reverse tilt state earlier than other liquid crystal molecules that are going to be tilted with the vertical electric field as shown in FIG. 8B.

The liquid crystal molecule Rv that has entered the reverse tilt state at the earlier stage has an adverse effect on the movement of the other liquid crystal molecules that are going to be tilted in the horizontal direction of the substrate surface as depicted by the broken line in accordance with the vertical electric field. Therefore, in the pixel that is to transition to a white pixel, a region where the reverse tilt occurs broadens over a wide area in a fashion such that the region encroaches on the pixel that is to transition to a white pixel from the gap without ceasing at the gap between the pixel that is to transition to a white pixel and the black pixel as shown in FIG. 8C.

Figure 8C:
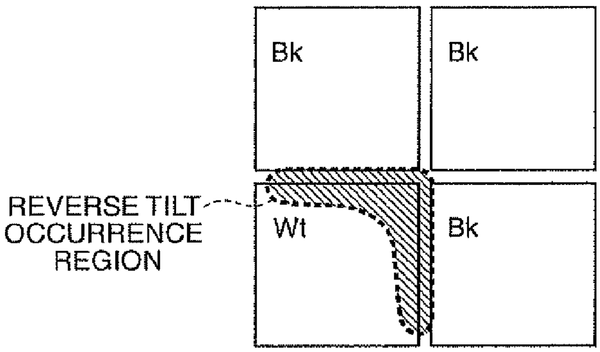

Given the above, it can be said from FIGS. 8A to 8C that when a target pixel that is going to transition to a white pixel is surrounded by black pixels, and the black pixels are adjacent to the target pixel on the right-top side, the right side, and the top side, a reverse tilt occurs in an inner circumferential region of the target pixel along the right and top sides.

Such a change in the pattern shown in FIG. 8A is not limited to the example shown in FIG. 7A, but also occurs in a case where the pattern made up of black pixels moves in the rightward direction by a distance of one pixel for each frame as shown in FIG. 7B, a case where the pattern moves in the upward direction by a distance of one pixel for each frame as shown in FIG. 7C, and other cases. Moreover, such a change also occurs in a case where a pattern made up of white pixels moves on the background region made up of black pixels in the top-right, rightward, or upward direction by a distance of one pixel for each frame, as in the case of looking at FIG. 26 from a different perspective.

Figure 9A:
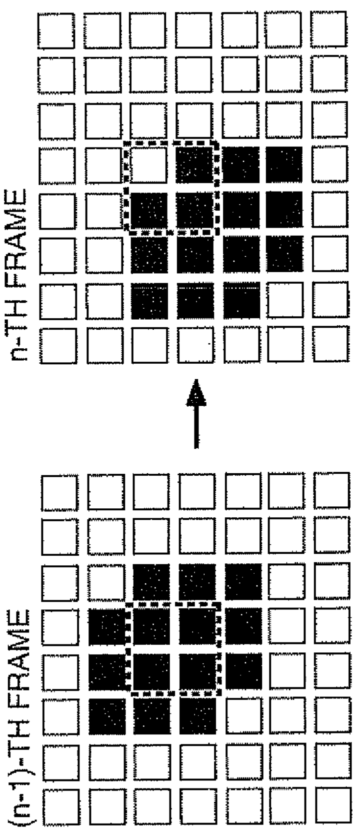
FIGS. 9A to 9C illustrate movement of an image in the liquid crystal panel.

Next, the four (2×2) pixels surrounded by a broken line as shown in FIG. 9A, in the liquid crystal panel 100 when a pattern made up of black pixels moves on a background region made up of white pixels in the bottom-left direction by a distance of one pixel for each frame will be focused on.

Figure 10A:
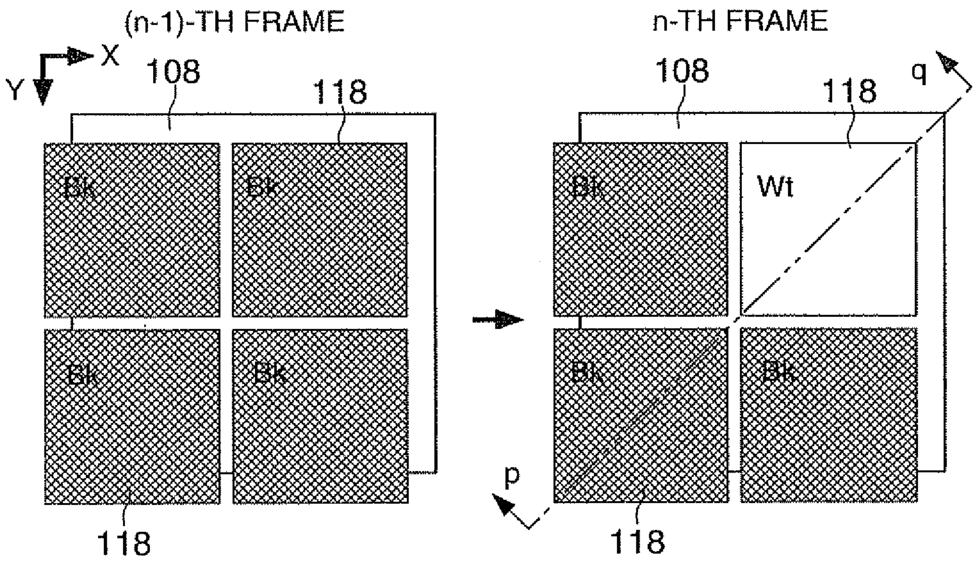
FIGS. 10A to 10C illustrate reverse tilt occurring in the liquid crystal panel.

That is, a case in which the four (2×2) pixels transition from a state where all the four pixels are black pixels in the (n−1)-th frame to a state where only one pixel on the top-right is a white pixel in the n-th frame as shown in FIG. 10A will be considered.

Figure 10B:
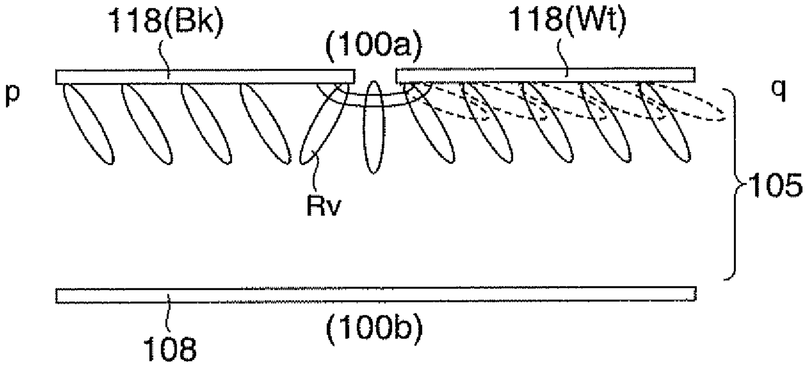
Figure 10C:
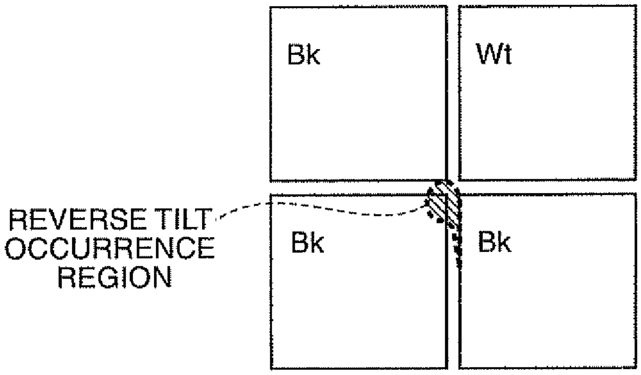

Even after this transition, a horizontal electric field that is stronger than the vertical electric field generated between the pixel electrode 118 (Wt) and the common electrode 108 is generated between the pixel electrode 118 (Bk) of the black pixel and the pixel electrode 118 (Wt) of the white pixel. With this horizontal electric field, a liquid crystal molecule Rv in the black pixel close to an adjacent white pixel enters a reverse tilt state with its alignment changed earlier than other liquid crystal molecules that are going to be tilted with the vertical electric field as shown in FIG. 10B. However, since the vertical electric field does not change in the black pixels from that in the (n−1)-th frame, the reverse tilt has little effect on the other liquid crystal molecule. Therefore, in the pixels that do not transition from the black pixels, a region where the reverse tilt occurs is negligibly narrow compared to the example of FIG. 8C as shown in FIG. 10C.

On the other hand, among the four (2×2) pixels, in the pixel on the top-right that transitions from black to white, the initial alignment direction of the liquid crystal molecules is barely affected by the horizontal electric field. Thus, even when a vertical electric field is applied, almost no liquid crystal molecule enters the reverse tilt state. Therefore, in the pixel on the top-right, as the vertical electric field intensity increases, the liquid crystal molecules are properly tilted in the horizontal direction of the substrate surface as depicted by the broken line in FIG. 10B. As a result, the pixel transitions to an intended white pixel, and there is no deterioration in the display quality.

Figure 9B:
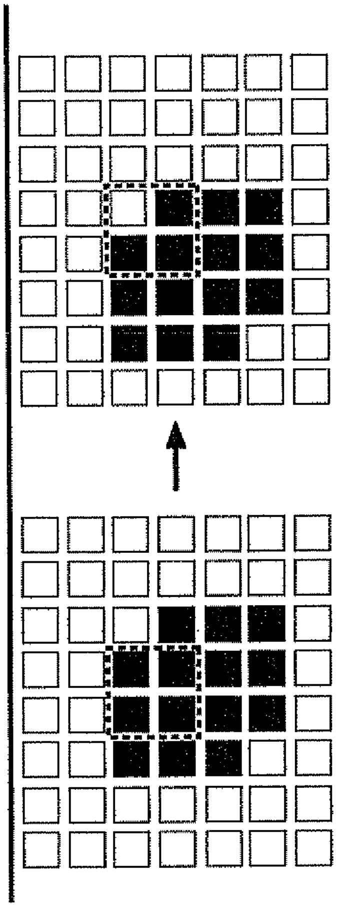
Figure 9C:
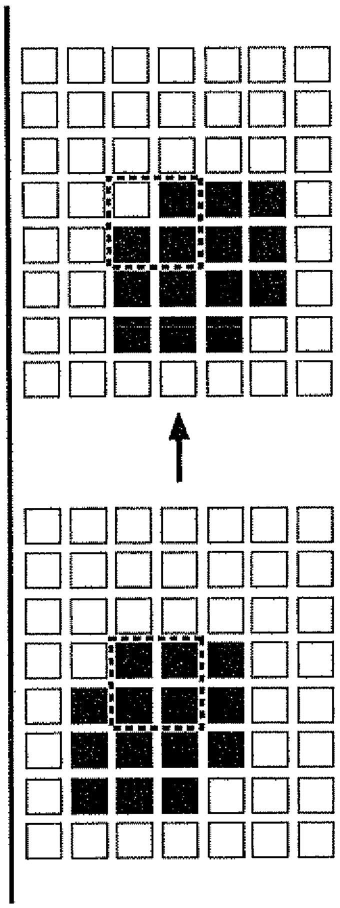

Such a change in the pattern shown in FIG. 10A is not limited to the example shown in FIG. 9A, but also occurs in a case where the pattern made up of black pixels moves in the leftward direction by a distance of one pixel for each frame as shown in FIG. 9B, a case where the pattern moves in the downward direction by a distance of one pixel for each frame as shown in FIG. 9C, and other cases. Moreover, such a change also occurs in a case where a pattern made up of white pixels moves on the background region made up of black pixels in the bottom-left, leftward, or downward direction by a distance of one pixel for each frame, as in the case of looking at FIG. 26 from a different perspective.

In the VA-mode (normally black-mode) liquid crystal considered in the description of FIGS. 6A to 10C, it can be said that when a certain n-th frame is focused on, the following pixels will be affected by reverse tilt domain in the n-th frame if the following conditions are satisfied. That is, (1) when an n-th frame is focused on, a dark pixel and a bright pixel are adjacent, namely a pixel in which the applied voltage is low and a pixel in which the applied voltage is high are adjacent so that the horizontal electric field increases; and (2) when in the n-th frame, the bright pixel (applied voltage: high) is positioned on the bottom-left side, the left side, or the bottom side corresponding to the upstream side of the tilt azimuth of the liquid crystal molecule with respect to the adjacent dark pixel (applied voltage: low), (3) if the liquid crystal molecules of a pixel that transitions to the bright pixel in the n-th frame are in the unstable state in the (n−1)-th frame one frame before the n-th frame, a reverse tilt occurs in that bright pixel in the n-th frame.

However, in the example of FIGS. 7A to 7C, a case where the four (2×2) pixels are black pixels in the (n−1)-th frame, and only the pixel on the bottom-left transitions to a white pixel in the subsequent n-th frame was illustrated. However, in general, the same movement occurs not only in the (n−1)-th frame and the n-th frame but also over a plurality of previous and subsequent frames including these frames. Therefore, it is considered that in a dark pixel (the pixel with a white circular dot) of which the liquid crystal molecules are in the unstable state in the (n−1)-th frame, a bright pixel is often made adjacent to that dark pixel on the bottom-left side, the left side, or the bottom side by the movement of the image pattern as shown in FIGS. 7A to 7C.

Thus, when a dark pixel and a bright pixel in an image represented by the video signal Vid-in are adjacent in an (n−1)-th frame, and the dark pixel is positioned on the top-right side, the right side, or the top side of the bright pixel, if a voltage that suppresses liquid crystal molecules from entering the unstable state is applied in advance to a liquid crystal device corresponding to that dark pixel, reverse tilt domain will not occur in the n-th frame because the condition (3) is not satisfied in the n-th frame by the movement of the image pattern although the conditions (1) and (2) are satisfied.

Based on this premise, a transition from the n-th frame to the (n+1)-th frame will be studied. When a dark pixel and bright pixel in an image represented by the video signal Vid-in are adjacent in the n-th frame, and the dark pixel is positioned on the top-right side, the right side, or the top side of the bright pixel, if an action is taken so as to suppress the liquid crystal molecules of a liquid crystal device corresponding to that dark pixel from entering the unstable state, the condition (3) is not satisfied in the (n+1)-th frame as the result of the movement of the image pattern by a distance of one pixel although the conditions (1) and (2) are satisfied. Therefore, it is possible to suppress the occurrence of reverse tilt domain in advance in the (n+1)-th frame which occurs later as seen from the n-th frame.

Next, a method in which when a dark pixel and a bright pixel in an image represented by the video signal Vid-in are adjacent in the n-th frame, and the dark pixel is in the above-mentioned positional relationship with respect to the bright pixel, the liquid crystal molecules of that dark pixel are suppressed from entering the unstable state will be studied. As described above, the case where the liquid crystal molecules are in the unstable state is when the applied voltage to the liquid crystal device is lower than Vc1. Therefore, as for the dark pixel satisfying the above-mentioned positional relationship, if the applied voltage to the liquid crystal device specified by the video signal Vid-in is lower than Vc1, it may be beneficial to forcibly correct the applied voltage to a voltage equal to or higher than Vc1 and apply to the liquid crystal device.

Next, a preferred value as the correction voltage will be studied. A high correction voltage is preferred if priority is given to the property wherein the liquid crystal molecules are in a more stable state, or the occurrence of reverse tilt domain is suppressed more reliably when the applied voltage specified by the video signal Vid-in is lower than Vc1, and the applied voltage is corrected to a voltage equal to or higher than Vc1 and applied to the liquid crystal device. However, in the normally black mode, transmittance increases as the applied voltage to the liquid crystal device increases. Since the gradation level specified by the video signal Vid-in is originally the transmittance of the dark pixel, namely has a low value, increasing the correction voltage results in an image which is not displayed based on the video signal Vid-in.

On the other hand, the lower limit voltage Vc1 is preferred if priority is given to the property wherein a change in transmittance is not recognizable even when the voltage corrected to be equal to or higher than Vc1 is applied to the liquid crystal device. As described above, the correction voltage is determined based on which property is to be prioritized. In this embodiment, although Vc1 is used as the correction voltage, a voltage higher than Vc1 may be used.

In the VA mode, liquid crystal molecules are closest to each other in the direction perpendicular to the substrate surface when the applied voltage to the liquid crystal device is zero. The voltage Vc1 has such a magnitude that it gives an initial tilt angle to the liquid crystal molecules, and the liquid crystal molecules begin to be tilted in response to application of that voltage. In general, the voltage Vc1 that causes the liquid crystal molecules to enter the stable state is related to various parameters of the liquid crystal panel and is not determined as one voltage. For example, in a liquid crystal panel like this embodiment where the gap between the pixel electrodes 118 is narrower than the gap (cell gap) between the pixel electrode 118 and the common electrode 108, the voltage is approximately 1.5 V. Therefore, 1.5 V is the lower limit voltage, and the correction voltage may be equal to or higher than that voltage. In other words, if the applied voltage to the liquid crystal device is lower than 1.5 V, the liquid crystal molecules are in the unstable state.

In the case of images which involve movement, it may be, or may be not, necessary to correct the gradation level of a pixel that is adjacent to the boundary in the present, frame represented by the video signal Vid-in if the movement of an image including a frame (namely, the previous frame) occurring one frame earlier than the present frame is taken into consideration. In the embodiment of the invention, the occurrence of reverse tilt domain is suppressed with the state of the previous frame considered at the time of making correction on the present frame.

Figure 3:
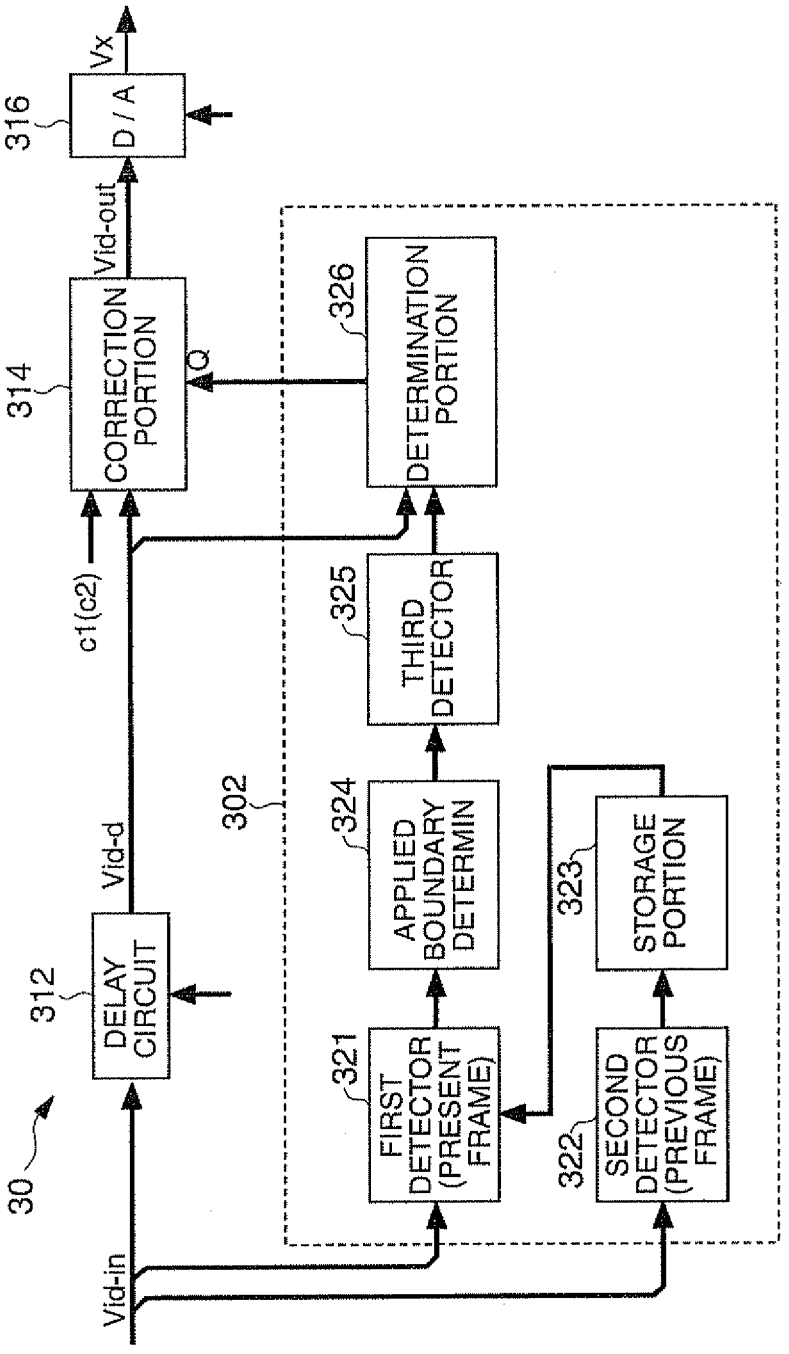
FIG. 3 shows a configuration of the video processing circuit.

The video processing circuit 30 shown in FIG. 3 is a circuit that processes the video signal Vid-in of the n-th frame so as to prevent the occurrence of reverse tilt domain in the liquid crystal panel 100 in advance based on the idea described above.

Next, the details of the video processing circuit 30 will be described with reference to FIG. 3. As shown in FIG. 3, the video processing circuit 30 includes a boundary detector 302, a delay circuit 312, a correction portion 314, and a D/A converter 316.

The delay circuit 312 is configured by a FIFO (Fast In Fast Out) memory or a multi-stage latch circuit and is configured to store the video signal Vid-in supplied from the high-order device and read out the video signal after the passage of a predetermined period to be output as a video signal Vid-d. The storage and readout operations in the delay circuit 312 are controlled by the scanning control circuit 20.

In this specification, the boundary detector 302 includes a first detector 321, a second detector 322, a storage portion 323, an applied boundary determiner 324, a third detector 325, and a determination portion 326.

The first detector 321 analyzes an image represented by the video signal Vid-in so as to determine whether or not there is a portion where a pixel (first pixel) in the gradation range a and a pixel (second pixel) in the gradation range b are adjacent in the vertical or horizontal direction. When the adjacent portion is determined to be present, the first detector 321 detects the adjacent portion as a boundary and outputs position information of the boundary. The first detector 321 corresponds to a first boundary detector.

The boundary as used therein merely refers to a portion where a dark pixel in the gradation range a and a bright pixel in the gradation range b are adjacent, namely a portion where a strong horizontal electric field is generated. Therefore, for example, a portion where a pixel in the gradation range a and a pixel in a different gradation range d (see FIG. 4A) different from the gradation range a and the gradation range b are adjacent, and a portion where a pixel in the gradation range b and a pixel in the gradation range d are adjacent are not treated as the boundary.

The second detector 322 analyzes an image represented by the video signal Vid-in of the previous frame to detect a portion where a pixel in the gradation range a and a pixel in the gradation range b are adjacent as the boundary. Here, the same definition as used for the first detector 321 applies to the boundary detected by the second detector 322.

The storage portion 323 stores the information on the boundary detected by the second detector 322 and outputs the information with a delay of one frame period.

Therefore, the boundary detected by the first detector 321 is associated with the present frame, whereas the boundary detected by the second detector 322 and stored in the storage portion 323 is associated with the frame occurring one frame before the present frame. Thus, the second detector 322 corresponds to a second boundary detector.

The applied boundary determiner 324 determines a portion obtained by excluding the same portion as the boundary between in previous frame image stored in the storage portion 323 from the boundary in the present frame image detected by the first detector 321 as an applied boundary.

The third detector 325 analyzes the image represented by the video signal Vid-in so as to determine whether or not the portion where the pixel in the gradation range a and the pixel in the gradation range b are adjacent in the vertical or horizontal direction is present in the boundary detected by the first detector 321. Moreover, the third detector 325 extracts a portion where a dark pixel is positioned on the top side thereof and a bright pixel is positioned on the bottom side thereof, and a portion where a dark pixel is positioned on the right side thereof and a bright pixel is positioned on the left side thereof from the applied boundary determined by the applied boundary determiner 324, detects these portions as a risk boundary, and outputs the position information of the risk boundary. Thus, the third detector 325 corresponds to a third boundary detector.

The determination portion 326 determines whether or not a pixel represented by the delayed video signal Vid-d is a dark pixel which is adjacent to the risk boundary detected by the third detector 325. The determination portion 326 sets the output signal flag Q, for example, to "1" if the determination result is "Yes" and sets the flag Q to "0" if the determination result is "No."

Here, the case where "a pixel being adjacent to the risk boundary" as used herein includes a case where the pixel is adjacent to the risk boundary along one side thereof and a case where the risk boundary continuous in the vertical and horizontal directions is positioned at one corner of the pixel. Moreover, the first detector 321 is unable to detect the boundary in the vertical or horizontal direction of an image that is to be displayed unless video signals of some extent (at least three rows) are stored. The same applies to the second detector 322. Therefore, the delay circuit 312 is provided so as to adjust the timings at which the video signal Vid-in is supplied from the high-order device.

Since the timings of the video signal Vid-in supplied from the high-order device are different from the timings of the video signal Vid-d supplied from the delay circuit 312, strictly speaking, the horizontal scanning periods or the like of the two signals are not identical. However, in the following description, such periods will not be distinguished.

The storage operation and the like of the video signals Vid-in in the first, second, and third detectors 321, 322, and 325 are controlled by the scanning control circuit 20.

The correction portion 314 corrects the video signal Vid-d to a video signal having the gradation level c1 to be output as a video signal Vid-out when the flag Q supplied from the determination portion 326 is "1."

The correction portion 314 outputs the video signal Vid-d as a video signal Vid-out without correcting the gradation level when the flag Q is "0."

The D/A converter 316 converts the video signal Vid-out which is digital data to an analog data signal Vx. As described above, since this embodiment uses a field inversion method, the polarity of the data signal Vx is changed whenever one page of images is overwritten in the liquid crystal panel 100.

According to this video processing circuit 30, when a pixel represented by the video signal Vid-d is a dark pixel that is adjacent to the risk boundary, the flag Q is set to "1." Moreover, when the gradation level specified for that dark pixel is a level that is darker than c1, the gradation level of the dark pixel represented by the video signal Vid-d is corrected to c1 and output as the video signal Vid-out.

On the other hand, when the pixel represented by the video signal Vid-d is not the dark pixel that is adjacent to the risk boundary, or even if the pixel is the dark pixel adjacent to the risk boundary, the gradation level specified for that dark pixel is a bright level that is equal to or higher than c1, since in this embodiment, the flag Q is set to "0," the video signal Vid-d is output as the video signal Vid-out without correcting the gradation level.

Next, a display operation of the liquid crystal display device 1 will be described. The video signals Vid-in are sequentially supplied from the high-order device in one frame in the order of the positions (row, column) of the pixels, that is, the pixels on the positions (1,1) to (1,n), (2,1) to (2,n), (3,1) to (3,n), . . . , and (m,1) to (m,n). The video processing circuit 30 performs processing (for example delaying, correction, and the like) on the video signal Vid-in and outputs the processed video signal as the video signal Vid-out.

Figure 5B:
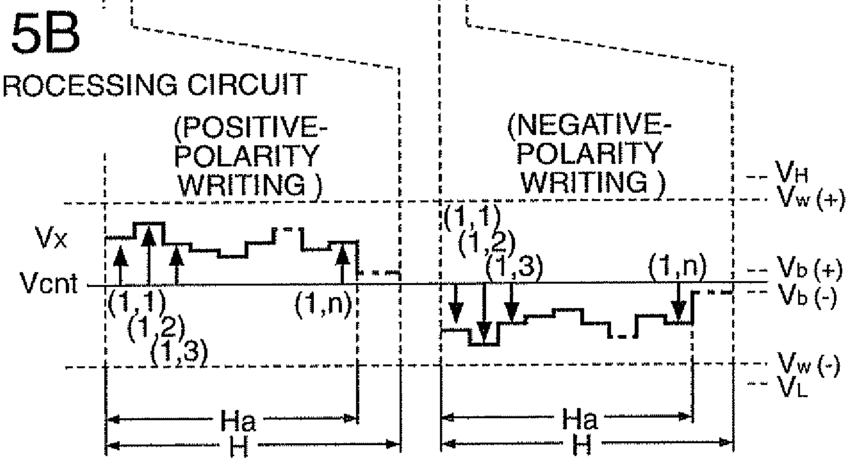

Here, in an effective horizontal scanning period (Ha) when the video signal Vid-out of the pixels on the row and column positions (1,1) to (1,n) is output, the processed video signal Vid-out is converted to a positive or negative data signal Vx (in this example, a positive data signal) by the D/A converter 316 as shown in FIG. 5B. The data signal Vx is sampled by the data line drive circuit 140 and output to the data lines 114 on the first to n-th columns as data signals X1 to Xn.

On the other hand, in a horizontal scanning period when the video signal Vid-out of the pixels on the row and column positions (1,1) to (1,n) is output, the scanning control circuit 20 causes the scanning line drive circuit 130 to set only the scanning signal Y1 to be in the H level. When the scanning signal Y1 is in the H level, since the TFTs 116 on the first row are turned ON, the data signals sampled in the data lines 114 are applied to the pixel electrodes 118 through the TFTs 116 in the ON state. In this way, a positive-polarity voltage corresponding to a gradation level specified by the video signal Vid-out is written to each of the liquid crystal devices on the row and column positions (1,1) to (1,n).

Subsequently, the video signal Vid-in of the pixels on the row and column positions (2,1) to (2,n) is similarly processed by the video processing circuit 30 and output as the video signal Vid-out. The video signal Vid-out is converted to a positive data signal by the D/A converter 316 and sampled by the data line drive circuit 140 and output to the data lines 114 on the first to n-th columns.

In the horizontal scanning period when the video signal Vid-out of the pixels on the row and column positions (2,1) to (2,n) is output, since the scanning line drive circuit 130 causes only the scanning signal Y2 to be in the H level, the data signals sampled in the data lines 114 are applied to the pixel electrodes 118 through the TFTs 116 which are on the second row and in the ON state. In this way, a positive-polarity voltage corresponding to a gradation level specified by the video signal Vid-out is written to each of the liquid crystal devices on the row and column positions (2,1) to (2,n).

Thereafter, the same writing operation is executed on the pixels on the third, fourth, and m-th rows, whereby a voltage corresponding to a gradation level specified by the video signal Vid-out is written to the respective liquid crystal devices, and a transmission image defined by the video signal Vid-in is created.

In the subsequent frame, the same writing operation is executed, except that the polarity of the data signal is inverted so that the video signal Vid-out is converted to a negative data signal.

FIG. 5B is a voltage waveform diagram showing an example of the data signal Vx when the video signal Vid-out of the pixels on the row and column positions (1,1) to (1,n) is output from the video processing circuit 30 over one horizontal scanning period (H). Since this embodiment uses the normally black mode, a positive data signal Vx has a voltage (depicted by an upper arrow ↑ in the drawing) on the higher side than the reference voltage Vcnt by an amount corresponding to the gradation level processed by the video processing circuit 30, whereas a negative data signal Vx has a voltage (depicted by a downward arrow ↓ in the drawing) on the lower side than the reference voltage Vcnt by an amount corresponding to the gradation level.

Specifically, the positive data signal Vx has a voltage that is shifted from the reference voltage Vcnt by an amount corresponding to the gradation within the range from the voltage Vw(+) corresponding to white to the voltage Vb(+) corresponding to black. On the other hand, the negative data signal Vx has a voltage that is shifted from the reference voltage Vcnt by an amount corresponding to the gradation within the range from the voltage Vw(−) corresponding to white to the voltage Vb(−) corresponding to black.

The voltages Vw(+) and Vw(−) are symmetrical to each other with respect to the voltage Vcnt. The voltages Vb(+) and Vb(−) are symmetrical to each other with respect to the voltage Vcnt.

FIG. 5B shows the voltage waveform of the data signal Vx, which is different from the voltage (the potential difference between the pixel electrode 118 and the common electrode 108) applied to the liquid crystal device 120. Moreover, the vertical scale of the data signal voltage in FIG. 5B is enlarged as compared to the voltage waveform of the scanning signal or the like in FIG. 5A.

A specific example of a correction process by the video processing circuit 30 will be described.

Figure 11A:
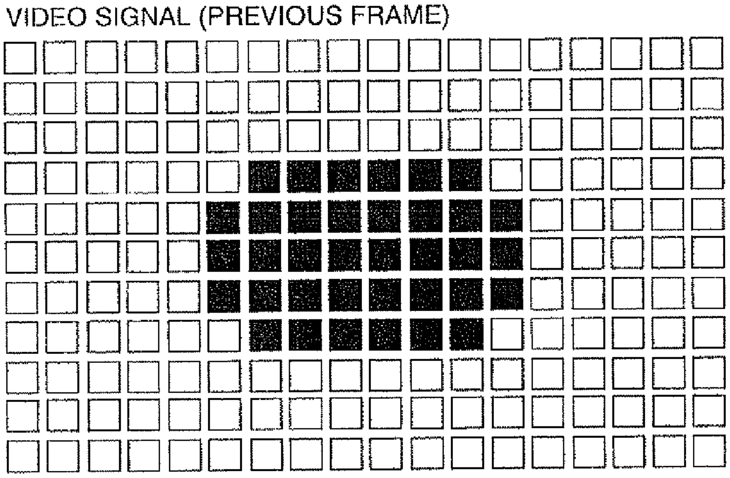
FIGS. 11A to 11C show a procedure of detecting a risk boundary in the video processing circuit.
Figure 11B:
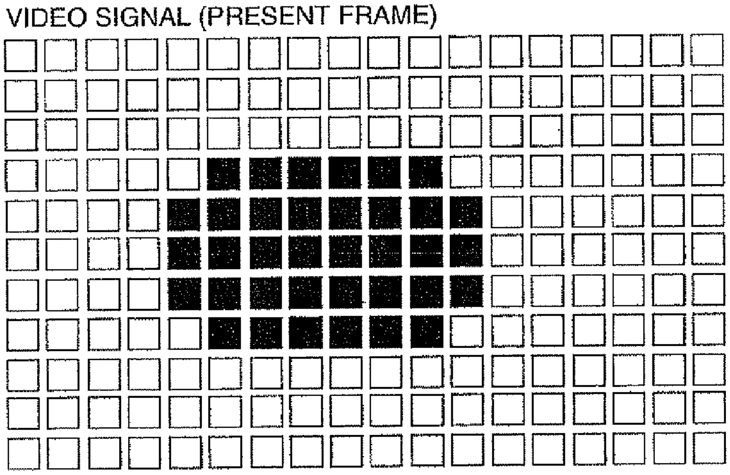
Figure 11C:
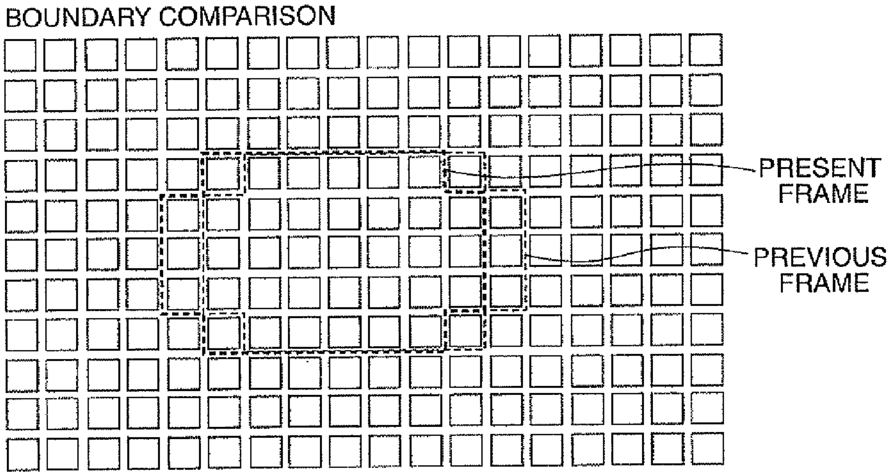

A case where an image represented by the video signal Vid-in of a frame occurring one frame earlier than the present frame is as shown in FIG. 11A, for example, and an image represented by the video signal Vid-in of the present frame is as shown in FIG. 11B, for example, namely, a pattern made up of dark pixels in the gradation range a moves on the background bright pixels in the gradation range b in the leftward direction will be considered. In this case, a boundary in the previous frame image detected by the first detector 322 and stored in the storage portion 323 and a boundary in the present frame image detected by the first detector 321 will be as shown in FIG. 11C.

Figure 12A:
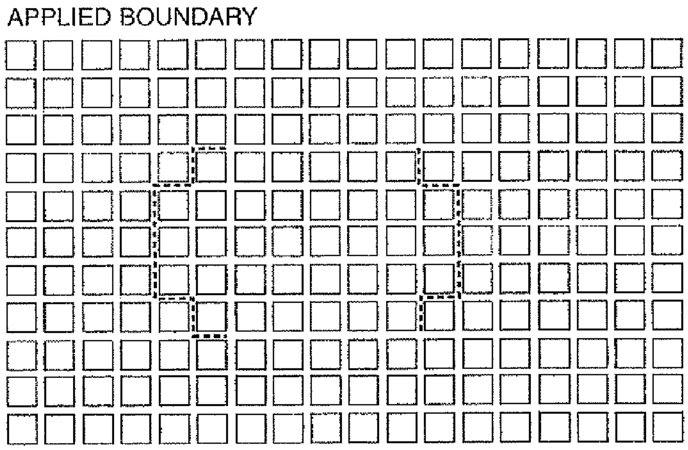
FIGS. 12A and 12B show a procedure of detecting a risk boundary in the video processing circuit.
Figure 12B:
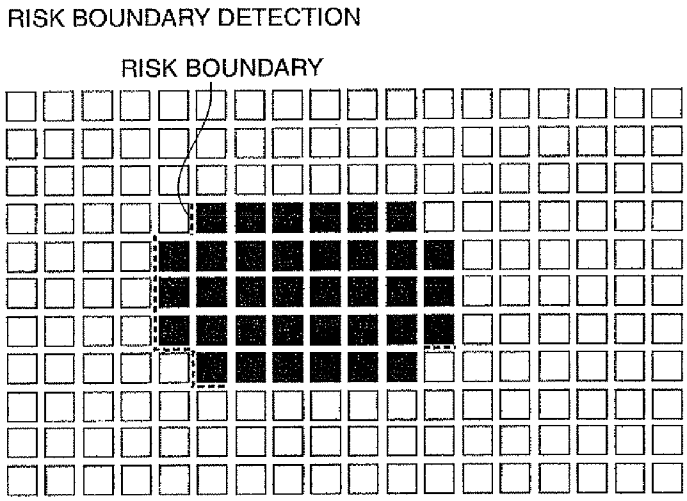

Therefore, the applied boundary determined by the applied boundary determiner 324 will be as shown in FIG. 12A. Moreover, the risk boundary detected by the third detector 325 will be as shown in FIG. 12B. That is, a portion where a dark pixel is positioned on the top side thereof and a bright pixel is positioned on the bottom side thereof, and a portion where a dark pixel is positioned on the right side thereof and a bright pixel is positioned on the left side thereof are extracted from the applied boundary and detected as the risk boundary.

Figure 13A:
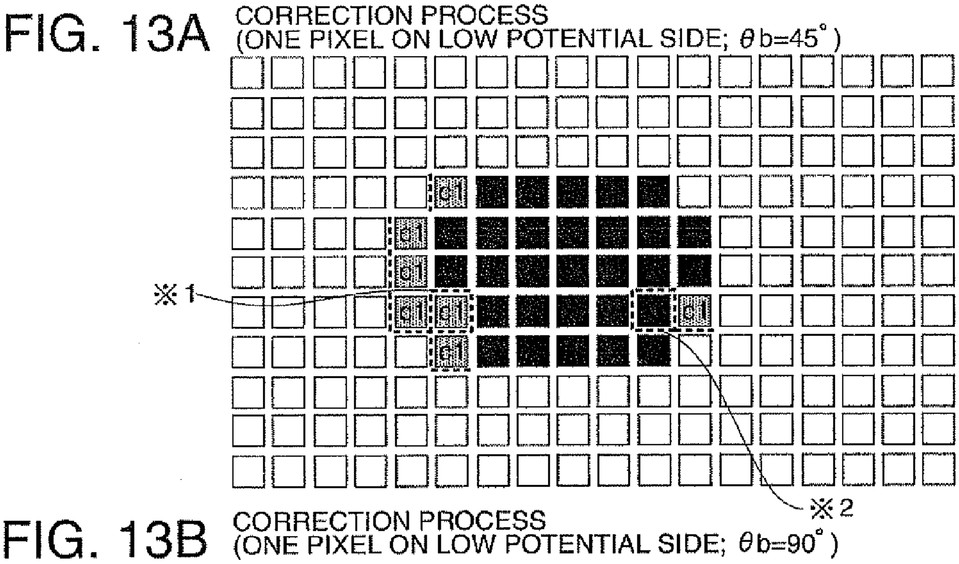
FIGS. 13A to 13C show a correction process in the video processing circuit.

When the gradation level specified for a dark pixel that is adjacent to the extracted risk boundary is a level that is darker than the gradation level c1, the correction portion 314 corrects the video signal to a video signal having the gradation level c1 as shown in FIG. 13A. In FIG. 13A, since a risk boundary continuous in the vertical and horizontal directions is positioned at one corner on the bottom left side of the black pixel indicated by *1, the black pixel is determined to be "adjacent to the risk boundary" and subjected to the determination in the correction portion 314 as to whether or not a darker level than the gradation level c1 is specified for that pixel. This is to cope with a case where a pattern corresponding to a white pixel positioned on the bottom left side of the black pixel indicated by *1 moves in the top-right direction by a distance of one pixel. In contrast, since a risk boundary continuous in only the vertical or horizontal direction but not in both vertical and horizontal directions is positioned at one corner of the black pixel indicated by *2, that black pixel is not subjected to the determination in the correction portion 314 as to the gradation level. This idea can be applied regardless of the tilt azimuth angle θb. Therefore, in the following description, description thereof will not be provided.

Since all the black pixels as used herein are pixels that are darker than the gradation level c1, the image shown in FIG. 11B will be as shown in FIG. 13A with the gradation level of the black pixels adjacent to the risk boundary corrected to the gradation level c1 by the correction portion 314. Therefore, even when a portion which transitions from a black pixel to a white pixel by the movement of a region made up of black pixels in either the top-right direction, the rightward direction, or the upward direction by a distance of one pixel is present in an image represented by the video signal Vid-in, in the liquid crystal panel 100, the portion does not directly transition to the white pixel from the state where the liquid crystal molecules are unstable but transitions to the white pixel after the liquid crystal molecules are forcibly put into the stable state by the application of the voltage Vc1 corresponding to the gradation level c1.

Therefore, in this embodiment, it is only necessary to perform processing for detecting the boundary and risk boundary between the pixels rather than processing the entire image of one frame. Thus, it is possible to suppress the size or complexity of the video processing circuit as compared to a configuration that analyzes the image of two frames or more to detect a movement. Moreover, it is possible to prevent regions in the state where reverse tilt domain is likely to occur from appearing continuously as a result of the movement of black pixels.

Moreover, in this embodiment, in the image represented by the video signal Vid-in, the pixels of which the gradation level is corrected are the dark pixels that are adjacent to the bright pixel. In addition, among the dark pixels of which the specified gradation level is darker than the gradation level c1, the pixels of which the gradation level is corrected are only the pixels which are positioned on the downstream side of the tilt azimuth with respect to that bright pixel. Therefore, a portion where an image is not displayed based on the video signal Vid-in can be suppressed to be small as compared to a configuration in, which all dark pixels which are adjacent to a bright pixel and of which the specified gradation level is darker than the gradation level c1 are corrected automatically regardless of the tilt azimuth angle.

Furthermore, in this embodiment, since the video signals having a value equal to or higher than a preset value are not automatically clipped away, there is no adverse effect on the contrast ratio which may otherwise occur if an unnecessary voltage range is provided additionally. Moreover, since it is not necessary to apply changes to the structure of the liquid crystal panel 100, the aperture ratio will not decrease, and the invention can be applied to a liquid crystal panel which is not manufactured in advance so as to have a new structure.

Other Examples of Tilt Azimuth Angle

In the embodiment described above, a case where the tilt azimuth angle θb in the VA mode is 45° has been described as an example. Next, examples where the tilt azimuth angle θb has an angle other than 45° will be described.

Figure 14A:
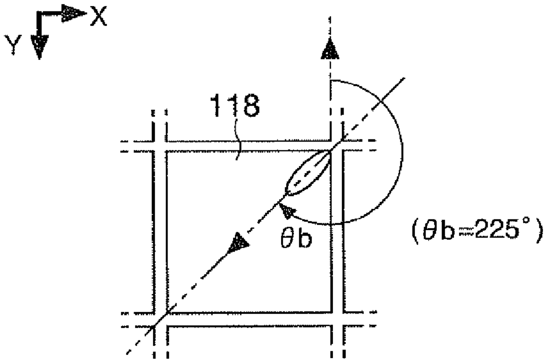
FIGS. 14A and 14B show the liquid crystal panel when a different tilt azimuth angle is used.
Figure 14B:
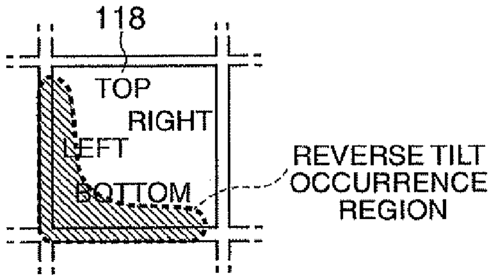

First, an example where the tilt azimuth angle θb is 225° as shown in FIG. 14A will be described. In this example, when only a target pixel transitions to a bright pixel from a state where the liquid crystal molecules of the target pixel and its surrounding pixels are unstable, a reverse tilt occurs in an inner circumferential region of the target pixel along the left and bottom sides as shown in FIG. 14B. This example is equivalent to the example shown in FIGS. 8A to 8C where the tilt azimuth angle θb is 45° if the pixels are rotated by 180°.

When the tilt azimuth angle θb is 225°, among the conditions (1) to (3) for the occurrence of reverse tilt domain when the tilt azimuth angle θb is 45°, the condition (2) is amended as follows. That is, the condition (2) should be read as (2) when in the n-th frame, the bright pixel (applied voltage: high) is positioned on the top-right side, the right side, or the top side corresponding to the upstream side of the tilt azimuth of the liquid crystal molecule with respect to the adjacent dark pixel (applied voltage: low). The conditions (1) and (3) remain unchanged.

Therefore, if the tilt azimuth angle θb is 225°, when a dark pixel and bright pixel are adjacent in the n-th frame, and the dark pixel is positioned on the bottom-left side, the left side, or the bottom side of the bright pixel, it may be beneficial to take an action so as to suppress the liquid crystal molecules of a liquid crystal device corresponding to that dark pixel from entering the unstable state.

Therefore, it may be beneficial to configure the third detector 325 in the video processing circuit 30 so as to extract a portion where a dark pixel is positioned on the bottom side thereof and a bright pixel is positioned on the top side thereof, and a portion where a dark pixel is positioned on the left side thereof and a bright pixel is positioned on the right side thereof from the applied boundary detected by the applied boundary determiner 324 and output the extracted portions as the risk boundary.

Figure 13B:
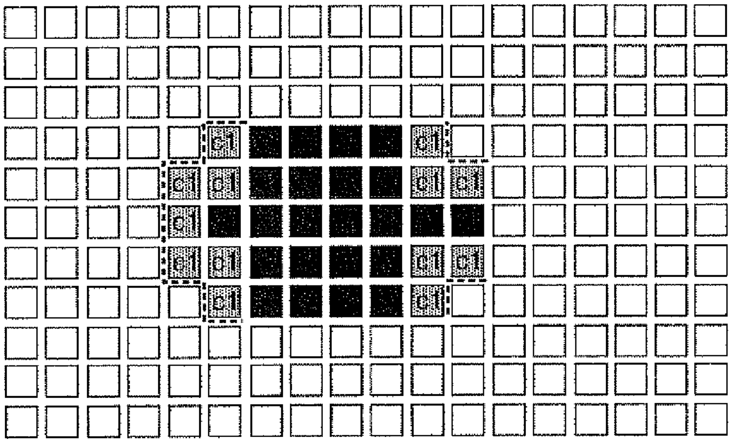
Figure 13C:
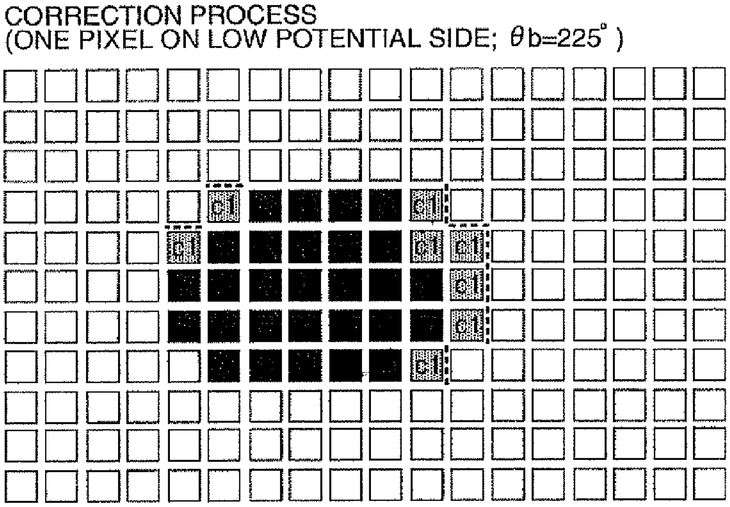

When the tilt azimuth angle θb is 225°, the image shown in FIG. 11B will be as shown in FIG. 13C with the gradation level of the black pixels adjacent to the risk boundary corrected to the gradation level c1 by the correction portion 314.

Figure 15A:
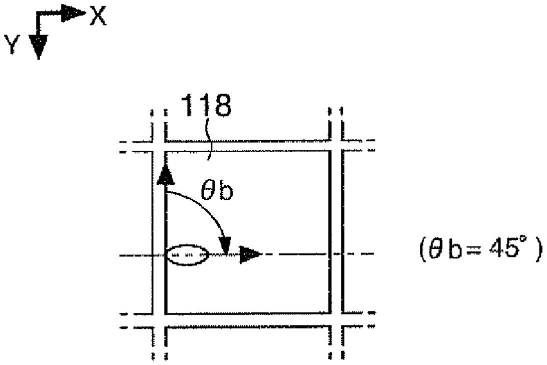
FIGS. 15A and 15B show the liquid crystal panel when a different tilt azimuth angle is used.
Figure 15B:
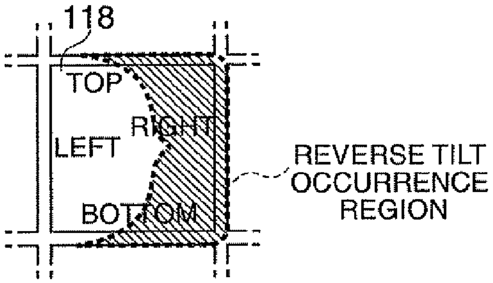

Next, an example where the tilt azimuth angle θb is 90° as shown in FIG. 15A will be described. In this example, when only an target pixel transitions to a bright pixel from a state where the liquid crystal molecules of the target pixel and its surrounding pixels are unstable, a reverse tilt occurs and concentrates on a region of the target pixel along the right side as shown in FIG. 15B. Thus, it can be said that in the target pixel, the reverse tilt domain occurs also in the top and bottom sides near the right side by an amount corresponding to the width of the reverse tilt domain occurring on the right side.

Thus, when the tilt azimuth angle θb is 90°, among the conditions (1) to (3) for the occurrence of reverse tilt domain when the tilt azimuth angle θb is 45°, the condition (2) is amended as follows. That is, the condition (2) should be read as (2) when in the n-th frame, the bright pixel (applied voltage: high) is positioned not only on the left side corresponding to the upstream side of the tilt azimuth of the liquid crystal molecule with respect to the adjacent dark pixel (applied voltage: low) but also on the top side or the bottom side where the pixel is affected by the reverse tilt domain occurred on the left side. The conditions (1) and (3) remain unchanged. Therefore, if the tilt azimuth angle θb is 90°, when a dark pixel and bright pixel are adjacent in the n-th frame, and the dark pixel is positioned on the right side, the bottom side, or the top side of the bright pixel, it may be beneficial to take an action so as to suppress the liquid crystal molecules of a liquid crystal device corresponding to that dark pixel from entering the unstable state.

Therefore, it may be beneficial to configure the third detector 325 in the video processing circuit 30 so as to extract a portion where a dark pixel is positioned on the right side thereof and a bright pixel is positioned on the left side thereof, a portion where a dark pixel is positioned on the top side thereof and a bright pixel is positioned on the bottom side thereof, and a portion where a dark pixel is positioned on the bottom side thereof and a bright pixel is positioned on the top side thereof from the applied boundary detected by the applied boundary determiner 324 and output the extracted portions as the risk boundary.

According to this configuration, if the tilt azimuth angle θb is 90°, even when a portion which transitions from a black pixel to a white pixel by the movement of a region made up of black pixels in either the upward direction, the top-right direction, the rightward direction, the bottom-right direction, or the downward direction by a distance of one pixel is present in an image represented by the video signal Vid-in, in the liquid crystal panel 100, the portion does not directly transition to the white pixel from the state where the liquid crystal molecules are unstable but transitions to the white pixel after the liquid crystal molecules are forcibly put into the stable state by the application of the voltage Vc1 corresponding to the gradation level c1. Thus, it is possible to suppress the occurrence of reverse tilt domain.

When the tilt azimuth angle θb is 90°, the image shown in FIG. 11B will be as shown in FIG. 13B with the gradation level of the black pixels adjacent to the risk boundary corrected to the gradation level c1 by the correction portion 314.

Second Embodiment

Next, a second embodiment of the invention will be described. In this embodiment, it is also assumed that the liquid crystal device operates in the normally black mode. This applies to the following embodiments unless stated otherwise. Moreover, in the following description, the same configurations as in the first embodiment will be denoted by the same reference numerals, and detailed description thereof will be appropriately omitted. In the embodiment described above, the gradation level of only the dark pixels adjacent to the risk boundary was corrected to the gradation level c1. However, in this embodiment, when two or more (plural) dark pixels are continuous in the direction away from the risk boundary with respect to a bright pixel, the gradation level of the plurality of dark pixels is corrected to the gradation level c1.

The video processing circuit 30 of this embodiment is different from that of the first embodiment, in that the content determined by the determination portion 326 is changed.

The determination portion 326 determines whether or not a pixel represented by the video signal Vid-d delayed by the delay circuit 312 is a dark pixel, and whether or not the pixel is adjacent to the risk boundary detected by the third detector 325. The determination portion 326 sets the output signal flag Q, for example, to "1" if all the determination results are "Yes" and sets the flag Q to "0" if any one of the determination results is "No." When the flag Q set for a certain dark pixel is changed from "0" to "1," the determination portion 326 sets the flags Q for two or more dark pixels being continuous in the direction away from the risk boundary to In this example, the determination portion 326 sets the flags Q for three continuous dark pixels to "1."

A specific example of the correction process by the video processing circuit 30 will be described.

When an image represented by the video signal Vid-in of a frame occurring one frame earlier than the present frame is as shown in FIG. 11A, for example, and an image represented by the video signal Vid-in of the present frame is as shown in FIG. 11B, for example, if θb=45°, the gradation level is corrected as shown in FIG. 16A by the video processing circuit 30. Specifically, when two or more dark pixels which are adjacent to the detected risk boundary and of which the gradation level belongs to the gradation range a and is lower than the gradation level c1 are continuous in the direction away from the risk boundary, the video processing circuit 30 corrects the video signal so that the respective pixels have the gradation level c1. In this example, this dark pixel group is made up of three dark pixels.

Moreover, by the same way of thinking as used in the first embodiment, when θb=90°, the image shown in FIG. 11B is corrected to a video signal as shown in FIG. 16B by the video processing circuit 30. Moreover, when θb=225°, the image shown in FIG. 11B is corrected to a video signal as shown in FIG. 16C by the video processing circuit 30. As described above, since the dark pixels determined by the tilt azimuth of the liquid crystal device 120 are subjected to correction, it is possible to suppress the occurrence of reverse tilt domain while suppressing changes from the original image.

Now, it is assumed that the refresh time interval of the display screen of the liquid crystal panel 100 is S (msec) and the response time for the liquid crystal device 120 to enter its alignment state when the applied voltage to the respective bright pixels is corrected to the voltage Vc1 by the correction portion 314 is T (msec). When the liquid crystal panel 100 is driven at the constant speed, the time interval S is 16.7 msec that is equal to the frame rate. Therefore, if S(=16.7)≥T1, only one pixel that is adjacent to the risk boundary will be enough to be used as the dark pixel of which the gradation level is to be corrected to the gradation level c1. On the other hand, in recent years, the driving speed of the liquid crystal panel 100 is increasing to higher speeds such as 2×, 4×, or higher. In the high-speed driving, the high-order device supplies one page of video signals Vid-in for each frame similarly to the constant-speed driving. Therefore, in order to improve the visibility of movie images, there is a case where an intermediate image between the n-th frame and the (n+1)-th frame is created through interpolation techniques or the like and displayed on the liquid crystal panel 100. For example, in the case of 2× driving, the refresh time interval of the display screen is 8.35 (msec) that is half that of the constant speed driving. Therefore, each frame is divided into the two first and second fields, so that a refresh operation of displaying the image of the present frame is performed in the first field, for example, and a refresh operation of displaying an interpolation image corresponding to the image of the present frame and the image of the next frame is performed in the second field. Therefore, in the high-speed driving, there is a case where an image pattern moves by a distance of one frame in the divided fields of a frame.

When F (msec) is the period of a frame in which one page of video signals Vid-in is supplied, if a liquid crystal panel is driven at a UX speed that is U (U is an integer) times faster than the supply speed, the period of one field corresponds to F/U, which is the refresh time interval S of a display screen.

Therefore, when the liquid crystal panel 100 in which the video signals Vid-in are supplied in one frame of 16.7 msec is driven at a 2× speed, for example, the refresh time interval S of the display screen is 8.35 msec that is half that of the constant speed driving. Here, if the response time T1 is 24 msec, the preferred number of pixels subjected to correction will be approximately "24/8.35" which is "2.874xxx." Thus, the preferred number is "3" which is an addition of the integer parts "2" and "1."

As described above, according to this embodiment, even when the response time of a liquid crystal device is longer than the refresh time interval of the display screen such as when the liquid crystal panel 100 is driven at the 2× speed or higher, by appropriately setting the number of dark pixel group subjected to correction, it is possible to prevent the occurrence of display defects resulting from the above-described reverse tilt domain in advance. That is, in this embodiment where the normally black mode is used, although the dark pixel group subjected to correction is made up of three continuous dark pixels, the number is not limited to "3," and the number may be increased considering the response time of the liquid crystal device 120 and the driving speed of the liquid crystal panel 100.

According to the configuration of this embodiment, in addition to the above-mentioned advantage, the same advantage as in the first embodiment can be obtained.

Third Embodiment

Next, a third embodiment of the invention will be described.

In this embodiment, instead of the dark pixel adjacent to the risk boundary, which was subjected to correction in the first embodiment, the gradation level of a bright pixel positioned on the opposite side of the risk boundary with respect to that dark pixel is corrected. However, in this embodiment, no correction is performed for the dark pixel. In this embodiment, instead of increasing the gradation level of a dark pixel in order to suppress the occurrence of a state where "(3) the liquid crystal molecules of a pixel that transitions to that bright pixel in the n-th frame are in the unstable state in the (n−1)-th frame one frame before the n-th frame," the horizontal electric field is suppressed with attention paid to the condition "(1) when an n-th frame is focused on, a dark pixel and a bright pixel are adjacent, namely a pixel in which the applied voltage is low and a pixel in which the applied voltage is high are adjacent so that the horizontal electric field increases". That is, the video processing circuit 30 suppresses the horizontal electric field generated between the bright pixel and the dark pixel adjacent to each other with the risk boundary disposed therebetween by decreasing the applied voltage to the liquid crystal device 120 corresponding to the bright pixel adjacent to the risk boundary.

The video processing circuit 30 of this embodiment is different from that of the first embodiment, in that the gradation level input to the correction portion 314 and the content determined by the determination portion 326 are changed.

The determination portion 326 determines whether or not a pixel represented by the video signal Vid-d delayed by the delay circuit 312 is a bright pixel, and whether or not the pixel is adjacent to the risk boundary detected by the third detector 325. The determination portion 326 sets the output signal flag Q, for example, to "1" if all the determination results are "Yes" and sets the flag Q to "0" if any one of the determination results is "No."

When the flag Q supplied from the determination portion 326 is "1," the correction portion 314 corrects the video signal Vid-d to a video signal in which the specified gradation level of a bright pixel has a gradation level c2 and outputs the corrected video signal as the video signal Vid-out. Although the gradation level c2 is obtained from any one of the applied voltages that are lower than a threshold voltage Vth2 (second voltage) and equal to or higher than the threshold voltage Vth1 (first voltage), it is preferable that the gradation level c2 falls within 10% changes from the luminance when no correction is performed.

When the flag Q supplied from the determination portion 326 is "0," the correction portion 314 outputs the video signal Vid-d as the video signal Vid-out without correcting the gradation level.

A specific example of a correction process by the video processing circuit 30 will be described.

Figure 17A:
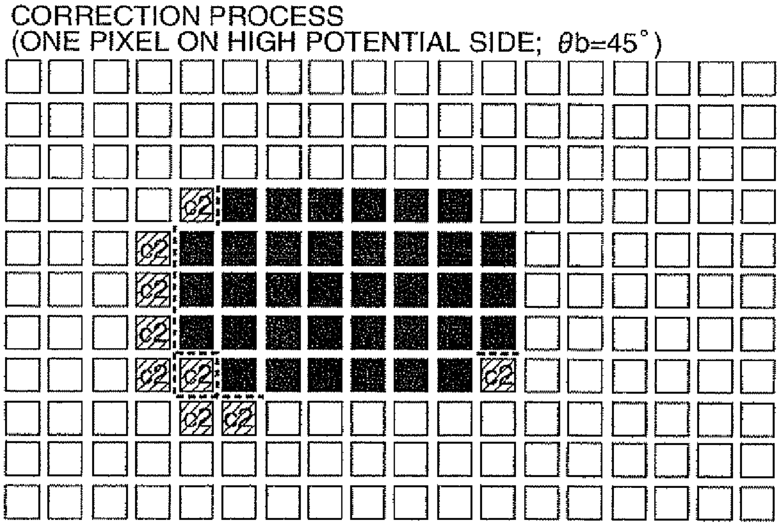
FIGS. 17A to 17C show a correction process in a video processing circuit according to a third embodiment of the invention.

When an image represented by the video signal Vid-in of a frame occurring one frame earlier than the present frame is as shown in FIG. 11A, for example, and an image represented by the video signal Vid-in of the present frame is as shown in FIG. 11B, for example, if θb=45°, the gradation level is corrected as shown in FIG. 17A by the video processing circuit 30. Specifically, the video processing circuit 30 corrects the video signal so that the gradation level of a bright pixel which is adjacent to the detected risk boundary and of which the gradation level belongs to the gradation range b has the gradation level c2.

Figure 17B:
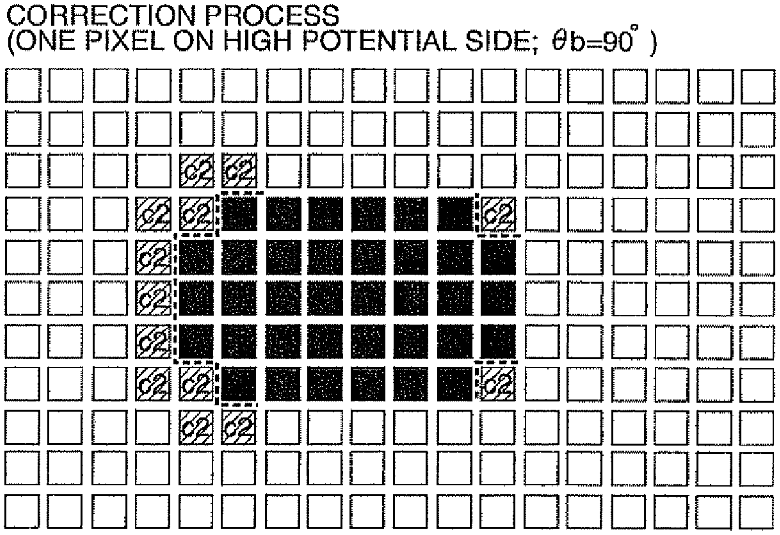
Figure 17C:
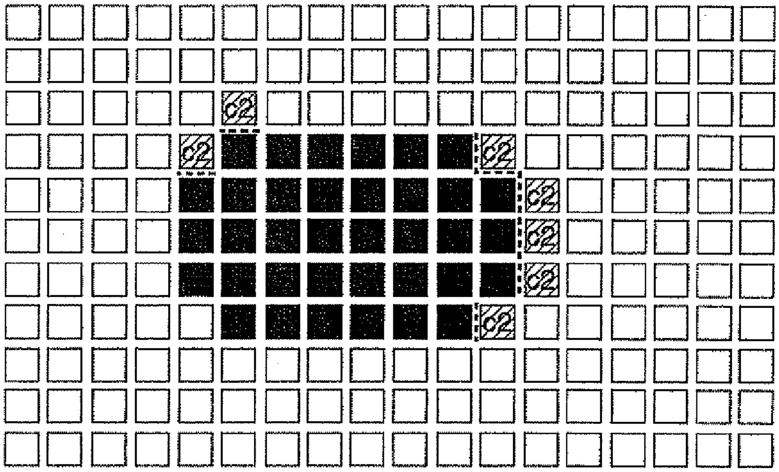

Moreover, by the same way of thinking as used in the first embodiment, when θb=90°, the image shown in FIG. 11B is corrected to a video signal as shown in FIG. 17B by the video processing circuit 30. Moreover, when θb=225°, the image shown in FIG. 11B is corrected to a video signal as shown in FIG. 17C by the video processing circuit 30. As described above, since the dark pixels determined by the tilt azimuth of the liquid crystal device 120 are subjected to correction, it is possible to suppress the occurrence of reverse tilt domain while suppressing changes from the original image.

In this way, the potential difference between the bright pixel and the dark pixel which are adjacent to each other with the risk boundary disposed therebetween is suppressed, whereby the occurrence of reverse tilt domain resulting from a horizontal electric field is suppressed. In addition to this, the same advantage as the first embodiment can be obtained.

Fourth Embodiment

Next, a fourth embodiment of the invention will be described.

In this embodiment, instead of the dark pixel group adjacent to the risk boundary, whose gradation level was subjected to correction in the second embodiment, the gradation level of two or more continuous bright pixels adjacent on the opposite side of the risk boundary with respect to that dark pixel group is corrected. The reason why the gradation level of the bright pixel is corrected is the same as that described in the third embodiment.

Moreover, in this embodiment, no correction is performed for the dark pixel.

The video processing circuit 30 of this embodiment is different from that of the second embodiment, in that the content determined by the determination portion 326 is changed.

The determination portion 326 determines whether or not a pixel represented by the video signal Vid-d delayed by the delay circuit 312 is a bright pixel, and whether or not the pixel is adjacent to the risk boundary detected by the third detector 325. The determination portion 326 sets the output signal flag Q, for example, to "1" if all the determination results are "Yes" and sets the flag Q to "0" if any one of the determination results is "No." When the flag Q set for a certain bright pixel is changed from "0" to "1," the determination portion 326 sets the flags Q for two or more bright pixels being continuous in the direction away from the risk boundary to "1." In this example, the determination portion 326 sets the flags Q for three continuous bright pixels to "1."

A specific example of the correction process by the video processing circuit 30 will be described.

Figure 18A:
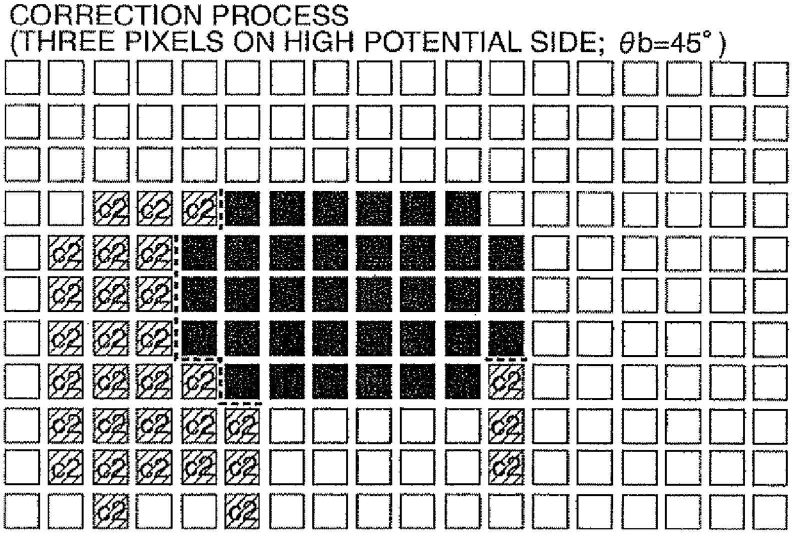
FIGS. 18A to 18C show a correction process in a video processing circuit according to a fourth embodiment of the invention.

When an image represented by the video signal Vid-in of a frame occurring one frame earlier than the present frame is as shown in FIG. 11A, for example, and an image represented by the video signal Vid-in of the present frame is as shown in FIG. 11B, for example, if θb=45°, the gradation level is corrected as shown in FIG. 18A by the video processing circuit 30. Specifically, when two or more bright pixels which are adjacent to the detected risk boundary and of which the gradation level belongs to the gradation range b are continuous in the direction away from the risk boundary, the video processing circuit 30 corrects the video signal so that the respective bright pixels have the gradation level c2. In this example, this bright pixel group is made up of three bright pixels.

Figure 18B:
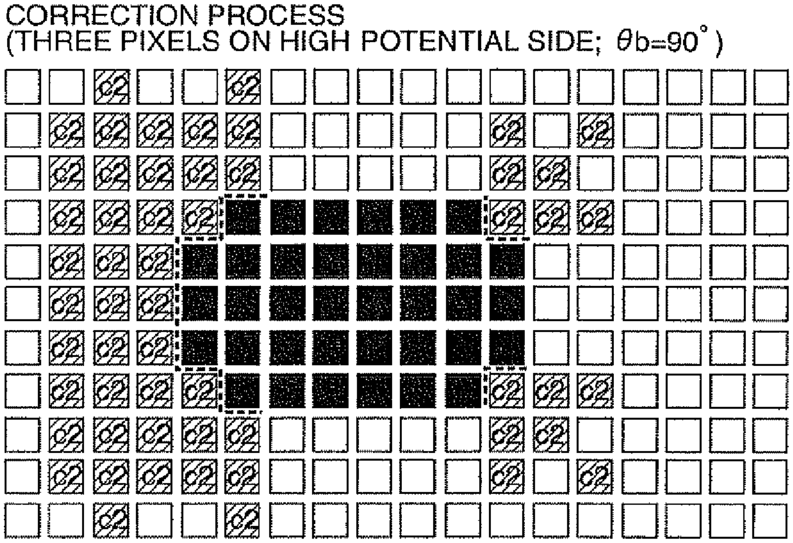
Figure 18C:
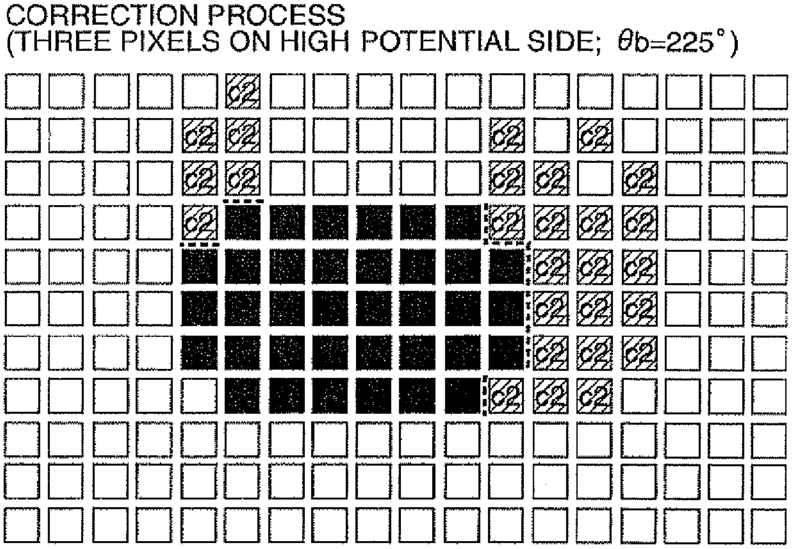

Moreover, by the same way of thinking as used in the first embodiment, when θb=90°, the image shown in FIG. 11B is corrected to a video signal as shown in FIG. 18B by the video processing circuit 30. Moreover, when θb=225°, the image shown in FIG. 11C is corrected to a video signal as shown in FIG. 18C by the video processing circuit 30. As described above, since the dark pixels determined by the tilt azimuth of the liquid crystal device 120 are subjected to correction, it is possible to suppress the occurrence of reverse tilt domain while suppressing changes from the original image.

The same advantage as in the second embodiment can be obtained because it is possible to prevent the occurrence of reverse tilt domain even when the response time of a liquid crystal device is longer than the refresh time interval of the display screen.

Fifth Embodiment

Next, a fifth embodiment of the invention will be described.

In the following description, the same configurations as in the first embodiment will be denoted by the same reference numerals, and detailed description thereof will be appropriately omitted. In this embodiment, both the correction of the dark pixel described in the first embodiment and the correction of the bright pixel described in the third embodiment are performed. That is, the video processing circuit 30 of this embodiment corrects the gradation level so that the conditions (1) and (3) are not satisfied.

Figure 19:
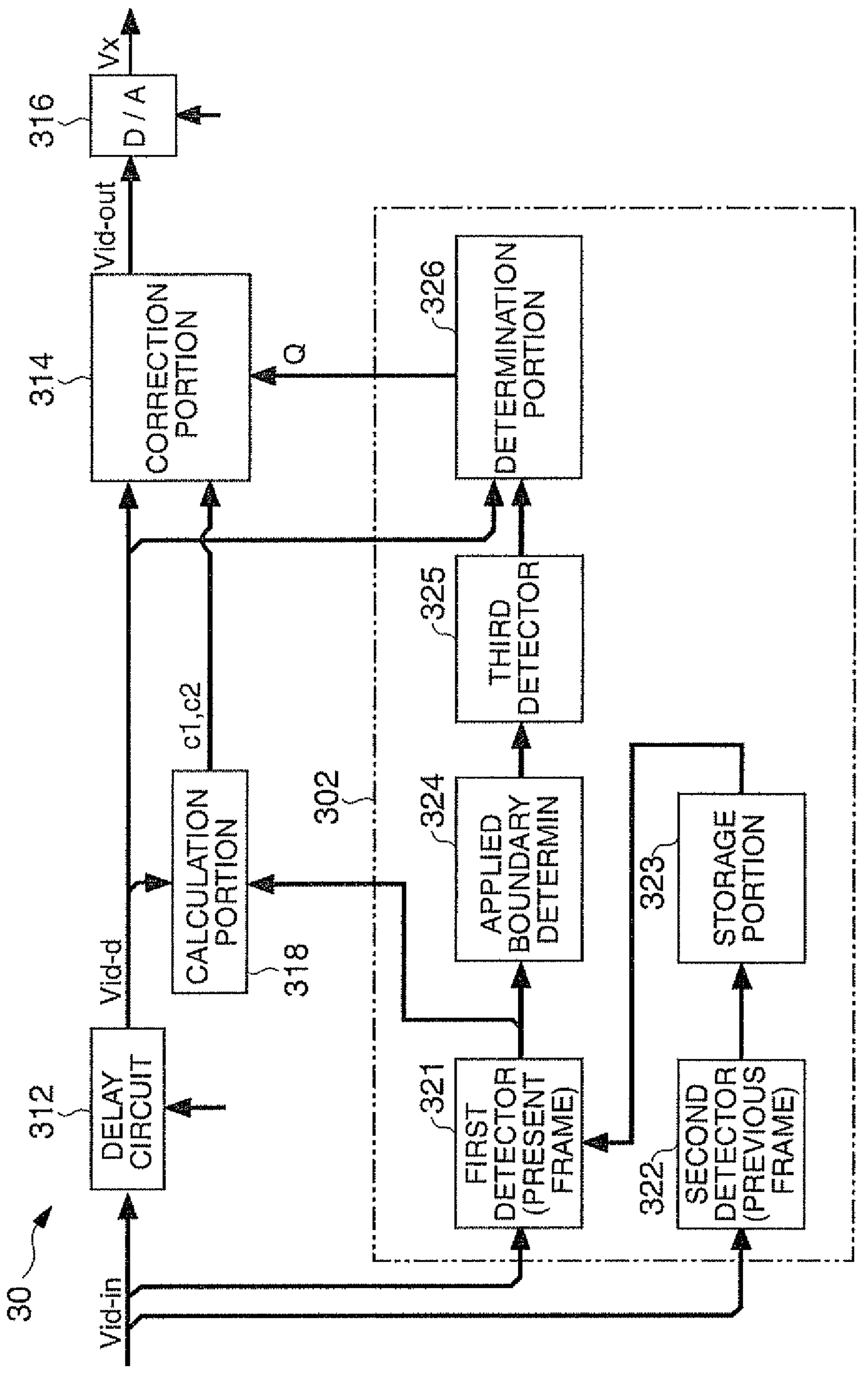
FIG. 19 shows a configuration of a video processing circuit according to a fifth embodiment of the invention.

FIG. 19 is a block diagram showing the configuration of the video processing circuit 30 according to this embodiment. The video processing circuit 30 is different from the video processing circuit 30 of the first embodiment, in that a calculation portion 318 is added, and the content determined by the determination portion 326 is changed.

Specifically, in the case of the normally black mode, for example, when a pixel represented by the delayed video signal Vid-d is adjacent to the risk boundary detected by the second detector 322, the calculation portion 318 calculates and outputs a gradation level c1 or c2 for that pixel depending on whether that pixel is a dark pixel or a bright pixel. Specifically, the gradation level c1 is output for the dark pixel, and gradation level c2 is output for the bright pixel.

The determination portion 326 determines whether or not a pixel represented by the video signal Vid-d delayed by the delay circuit 312 is a bright pixel, and whether or not the pixel is adjacent to the risk boundary detected by the second detector 322. The determination portion 326 sets the output signal flag Q, for example, to "1" if all the determination results are "Yes" and sets the flag Q to "0" if any one of the determination results is "No." The determination portion 326 also determines whether or not the pixel is a dark pixel of which the gradation level represented by the video signal Vid-d delayed by the delay circuit 312 is lower than the gradation level c1, and whether or not the pixel is adjacent to the risk boundary detected by the second detector 322. The determination portion 326 sets the output signal flag Q, for example, to "1" if all the determination results are "Yes" and sets the flag Q to "0" if any one of the determination results is "No."

When the flag Q output from the determination portion 326 is "1," the correction portion 314 corrects the video signal Vid-d so as to have the gradation level c1 output from the calculation portion 318 and outputs the corrected video signal as the video signal Vid-out. That is, when the gradation level of the dark pixel adjacent to the risk boundary is lower than the gradation level Cl, the correction portion 314 corrects the video signal Vid-d so as to have the gradation level c1 output from the calculation portion 318 and outputs the corrected video signal as the video signal Vid-out. Moreover, when the flag Q output from the determination portion 326 is "1," the correction portion 314 corrects the video signal Vid-d so as to have the gradation level c2 output from the calculation portion 318 and outputs the corrected video signal as the video signal Vid-out.

A specific example of a correction process by the video processing circuit 30 will be described.

Figure 20A:
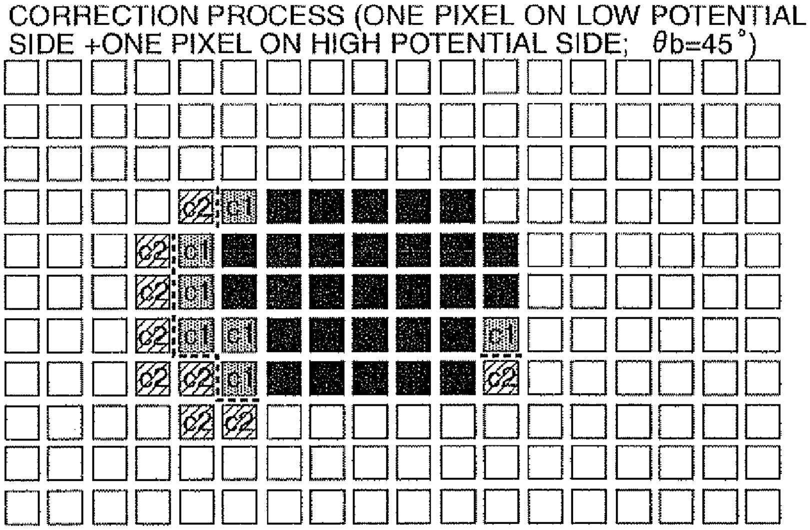
FIGS. 20A to 20C show a correction process in the video processing circuit.

When an image represented by the video signal Vid-in of a frame occurring one frame earlier than the present frame is as shown in FIG. 11A, for example, and an image represented by the video signal Vid-in of the present frame is as shown in FIG. 11B, for example, if θb=45°, the gradation level is corrected as shown in FIG. 20A by the video processing circuit 30.

By the same procedure as used in the first embodiment described above, the video processing circuit corrects the gradation level of the dark pixel adjacent to the risk boundary to the gradation level cl and corrects the video signal so that the bright pixels adjacent on the opposite side of that dark pixel with respect to the risk boundary have the gradation level c2.

Figure 20B:
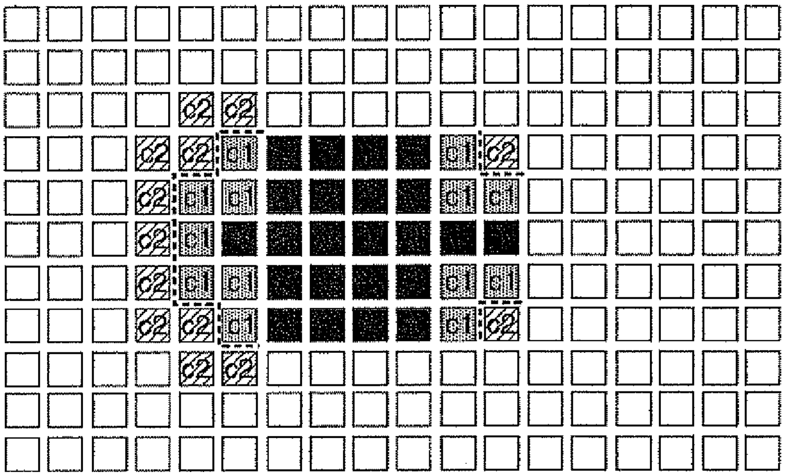
Figure 20C:
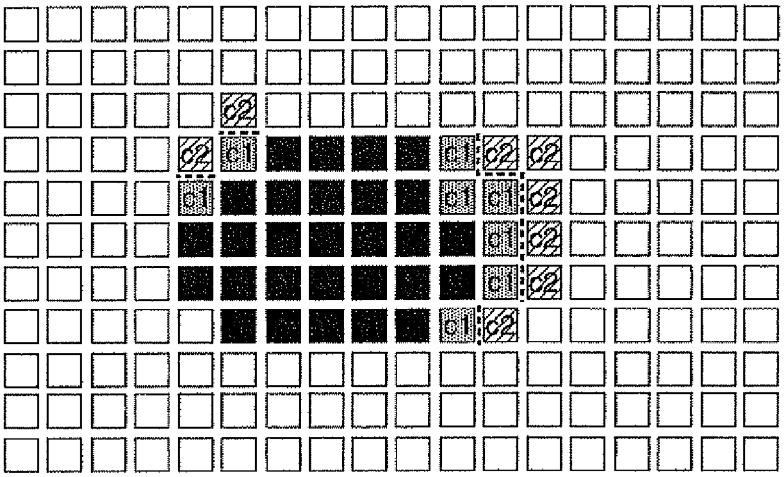

Moreover, by the same way of thinking as used in the first embodiment, when θb=90°, the image shown in FIG. 11B is corrected so as to have the gradation level as shown in FIG. 20B by the video processing circuit 30. Moreover, when θb=225°, the image shown in FIG. 11B is corrected so as to have the gradation level as shown in FIG. 20C by the video processing circuit 30.

According to this embodiment, the same advantages as in both the first and third embodiments can be obtained. Moreover, it is possible to suppress the generation of the horizontal electric field between the bright pixel and the dark pixel adjacent to each other with the risk boundary disposed therebetween and suppress the occurrence of reverse tilt domain more effectively.

Sixth Embodiment

Next, a sixth embodiment of the invention will be described.

In the following description, the same configurations as in the fifth embodiment will be denoted by the same reference numerals, and detailed description thereof will be appropriately omitted. The video processing circuit 30 of this embodiment is different from the video processing circuit 30 of the fifth embodiment, in that the content calculated by the calculation portion 318 and the content determined by the determination portion 326 are changed.

In the fifth embodiment, the gradation levels of the bright pixel and the dark pixels adjacent to each other with the risk boundary disposed therebetween are corrected. In contrast, in this embodiment, the gradation levels of two or more continuous bright pixels, including those bright pixels which are continuous in the direction away from the risk boundary and two or more continuous dark pixels, including those dark pixels which are continuous in the direction away from the risk boundary are corrected. The pixels subjected to the correction in this embodiment are the same as the combination of pixels subjected to the correction in the second and fourth embodiments.

In this embodiment, when a pixel represented by the delayed video signal Vid-d is adjacent to the risk boundary detected by the second detector 322, the calculation portion 318 calculates and outputs a gradation level c1 or c2 for the pixel depending on whether the pixel is a dark pixel or a bright pixel. Specifically, the gradation level c1 is output for two or more dark pixels which are adjacent to the risk boundary and are continuous on the opposite side of a bright pixel, and gradation level c2 is output for two or more bright pixels which are adjacent to the risk boundary and are continuous on the opposite side of a dark pixel.

The determination portion 326 determines whether or not a pixel represented by the video signal Vid-d delayed by the delay circuit 312 is a dark pixel of which the applied voltage is lower than Vc1, and whether or not the pixel is adjacent to the risk boundary detected by the second detector 322. The determination portion 326 sets the output signal flag Q, for example, to "1" if all the determination results are "Yes" and sets the flag Q to "0" if any one of the determination results is "No." When the flag Q set for a certain dark pixel is changed from "0" to "1," the determination portion 326 sets the flags Q for two or more dark pixels to "1." In this example, the determination portion 326 sets the flags Q for two or more continuous dark pixels including that dark pixel to "1." The determination portion 326 also determines whether or not a pixel represented by the video signal Vid-d delayed by the delay circuit 312 is a bright pixel of which the applied voltage is higher than Vc2, and whether or not the pixel is adjacent to the risk boundary detected by the second detector 322. The determination portion 326 sets the output signal flag Q, for example, to "1" if all the determination results are "Yes" and sets the flag Q to "0" if any one of the determination results is "No." When the flag Q set for a certain bright pixel is changed from "0" to "1," the determination portion 326 sets the flags Q for two or more bright pixels including those bright pixels to "1." In this example, the determination portion 326 sets the flags Q for two or more continuous bright pixels to "1."

When the flag Q output from the determination portion 326 is "1," the correction portion 314 corrects the video signal Vid-d so as to have the gradation level output from the calculation portion 318 and outputs the corrected video signal as the video signal Vid-out.

A specific example of a correction process by the video processing circuit 30 will be described.

When an image represented by the video signal Vid-in of a frame occurring one frame earlier than the present frame is as shown in FIG. 11A, for example, and an image represented by the video signal Vid-in of the present frame is as shown in FIG. 11B, for example, if θb=45°, the gradation level is corrected as shown in FIG. 21A by the video processing circuit 30.

In the case of the normally black mode, by the same procedure as used in the first embodiment described above, the video processing circuit 30 corrects the gradation level of the dark pixels to be subjected to the correction to the gradation level c1 and corrects the video signal so that two or more bright pixels which are adjacent on the opposite side of the dark pixel group with respect to the risk boundary and which are continuous in the direction away from the risk boundary have the gradation level c2. In this example, the dark pixel group is made up of two continuous dark pixels, and the bright pixel group to be subjected to correction is made up of two continuous bright pixels. Moreover, by the same way of thinking as used in the first embodiment, when θb=90°, the image shown in FIG. 11B is corrected so as to have the gradation level as shown in FIG. 21B by the video processing circuit 30. Moreover, when θb=225°, the image shown in FIG. 11B is corrected so as to have the gradation level as shown in FIG. 21C by the video processing circuit 30. As described above, since the dark pixels determined by the tilt azimuth of the liquid crystal device 120 are subjected to correction, it is possible to suppress the occurrence of reverse tilt domain while suppressing changes from the original image.

According to the configuration of this embodiment, the same advantage as in the fifth embodiment can be obtained. Moreover, for the same reason as mentioned in the second and fourth embodiments, it is possible to prevent the occurrence of reverse tilt domain even when the response time of a liquid crystal device is longer than the refresh time interval of the display screen.

In this example where the normally black mode is used, although the dark pixel group and the bright pixel group subjected to correction are made up of two continuous pixels, the number is not limited to "2," and the number may be increased considering the response time of the liquid crystal device 120 and the driving speed of the liquid crystal panel 100.

Modifications

TN Mode

In the embodiments described above, an example where a VA-mode liquid crystal is used in the liquid crystal 105 has been described. Next, an example where a TN-mode liquid crystal is used in the liquid crystal 105 will be described.

Figure 22A:
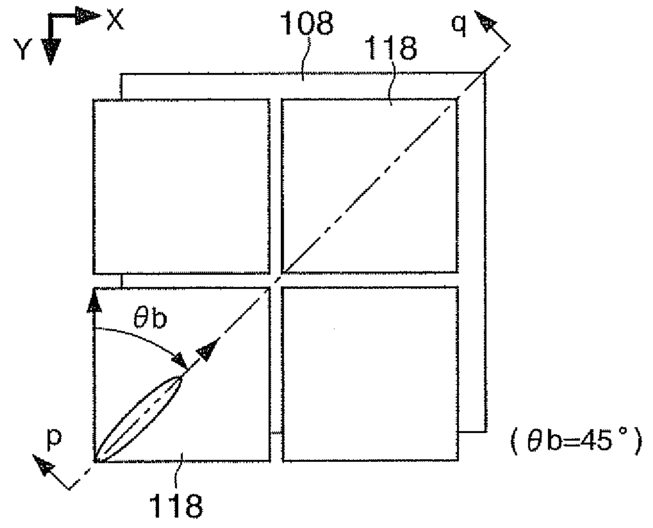
FIGS. 22A and 22B illustrate an initial alignment in the TN mode of the liquid crystal panel.
Figure 22B:
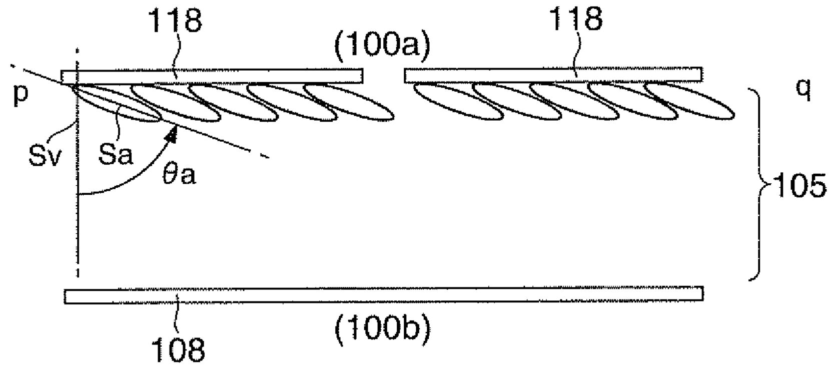

FIG. 22A shows 2×2 pixels in the liquid crystal panel 100, and FIG. 22B shows the liquid crystal panel 100 in a simplified cross-sectional view when cut along a vertical plane including the p-q line in FIG. 22A.

As shown in the drawings, it is assumed that in an initial alignment state, TN-mode liquid crystal molecules have a tilt angle of θa and a tilt azimuth angle of θb (=45°) in a state where the potential difference between the pixel electrode 118 and the common electrode 108 is zero. Contrary to the VA mode, since TN-mode liquid crystal molecules are tilted in the direction horizontal to the substrate surface, the tilt angle θa of the TN mode is larger than that of the VA mode.

In the example where a TN-mode liquid crystal is used in the liquid crystal 105, in many cases, the liquid crystal device 120 operates in the normally white mode wherein it appears white when no voltage is applied since favorable characteristics such as a high contrast ratio or the like can be obtained.

Figure 4B:
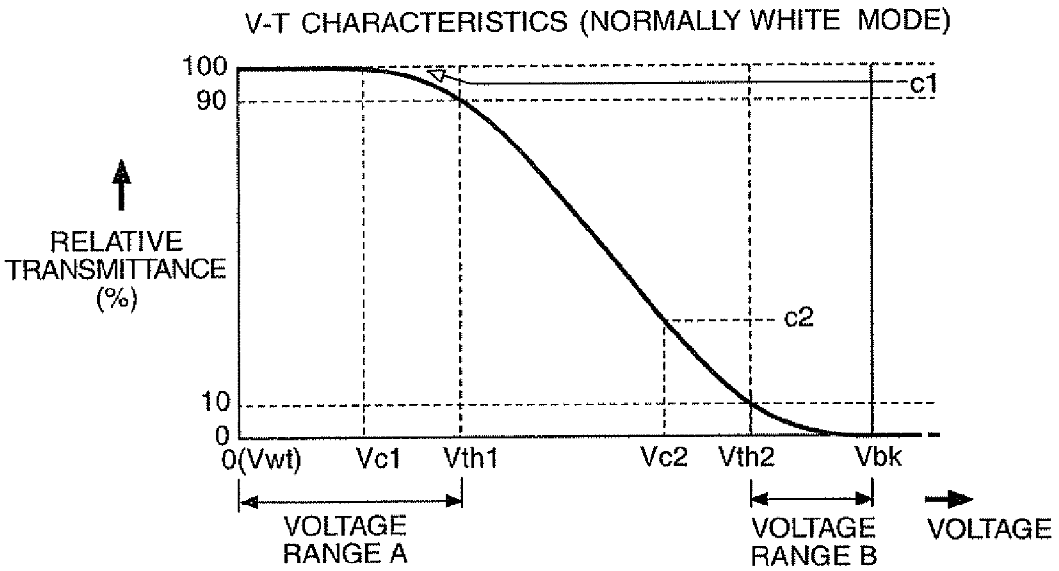

Therefore, when the liquid crystal 105 uses the TN-mode liquid crystal and operates in the normally white mode, the relationship between the applied voltage and the transmittance of the liquid crystal device 120 is represented by the V-T characteristics as shown in FIG. 4B. That is, the transmittance decreases as the applied voltage increases. However, since the liquid crystal molecules are in the unstable state when the applied voltage to the liquid crystal device 120 is lower than the voltage Vc1, there is no difference from the normally black mode.

Figure 23A:
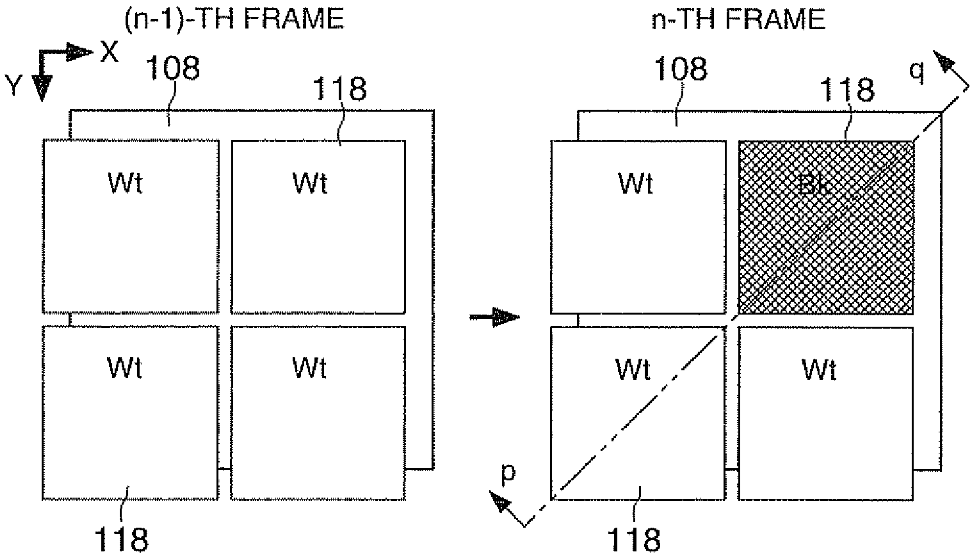
FIGS. 23A to 23C illustrate reverse tilt occurring in the liquid crystal panel.
Figure 23B:
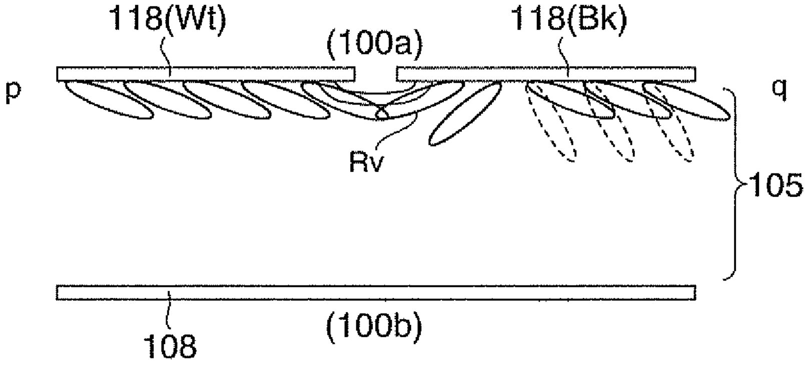

In the TN-mode liquid crystal operating in the normally white mode, a case in which the four (2×2) pixels transition from a state where all the four pixels are white pixels of which the liquid crystal molecules are in the unstable state in the (n−1)-th frame to a state where only one pixel on the top-right is a black pixel in the n-th frame as shown in FIG. 23A will be considered. As described above, in the normally white mode, the potential difference between the pixel electrode 118 and the common electrode 108 is larger in the black pixels than in the white pixels contrary to the normally black mode. Therefore, in the pixel on the top-right which transitions from white to black, the liquid crystal molecules tend to stand up in the direction (the direction perpendicular to the substrate surface) parallel to the electric field direction from the state depicted by the solid line to the state depicted by the broken line as shown in FIG. 23B.

However, the potential difference generated between the pixel electrode 118 (Wt) of the white pixel and the pixel electrode 118 (Bk) of the black pixel is approximately equal to the potential difference generated between the pixel electrode 118 (Bk) of the black pixel and the common electrode 108. Moreover, the gap between the pixel electrodes is narrower than the gap between the pixel electrode 118 and the common electrode 108. Therefore, comparing the electric field intensities, the horizontal electric field generated between the pixel electrode 118 (Wt) and the pixel electrode 118 (Bk) is stronger than the vertical electric field generated between the pixel electrode 118 (Bk) and the common electrode 108.

Since the pixel on the top-right is the white pixel of which the liquid crystal molecules are in the unstable state in the (n−1)-th frame, it takes a lot of time for the liquid crystal molecules to be tilted in accordance with the intensity of the vertical electric field. On the other hand, the horizontal electric field from the adjacent pixel electrode 118 (Wt) is stronger than the vertical electric field generated when a voltage having the black level is applied to the pixel electrode 118 (Bk). Therefore, in a pixel that is going to transition to a black pixel, a liquid crystal molecule Rv close to an adjacent white pixel enters a reverse tilt state earlier than other liquid crystal molecules that are going to be tilted with the vertical electric field as shown in FIG. 23B.

The liquid crystal molecule Rv that has entered the reverse tilt state at the earlier stage has an adverse effect on the movement of the other liquid crystal molecules that are going to stand up in the horizontal direction of the substrate surface as depicted by the broken line in accordance with the vertical electric field. Therefore, in the pixel that is to transition to a black pixel, a region where the reverse tilt occurs broadens over a wide area in a fashion such that the region encroaches on the pixel that is to transition to a black pixel from the gap without ceasing at the gap between the pixel that is to transition to a black pixel and the white pixel as shown in FIG. 23C.

Figure 23C:
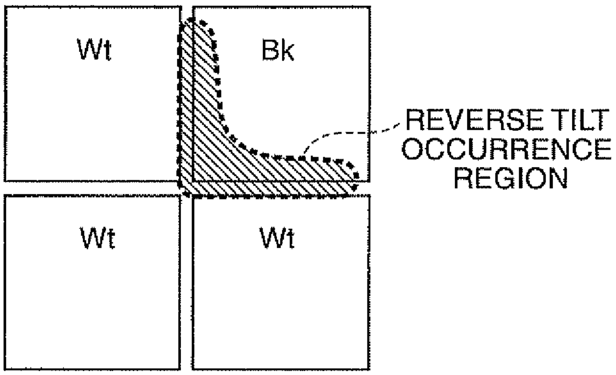

Given the above, it can be said from FIGS. 23A to 23C that when an target pixel that is going to transition to a black pixel is surrounded by white pixels, and the white pixels are adjacent to the target pixel on the bottom-left side, the left side, and the bottom side, a reverse tilt occurs in an inner circumferential region of the target pixel along the left and bottom sides.

Figure 24A:
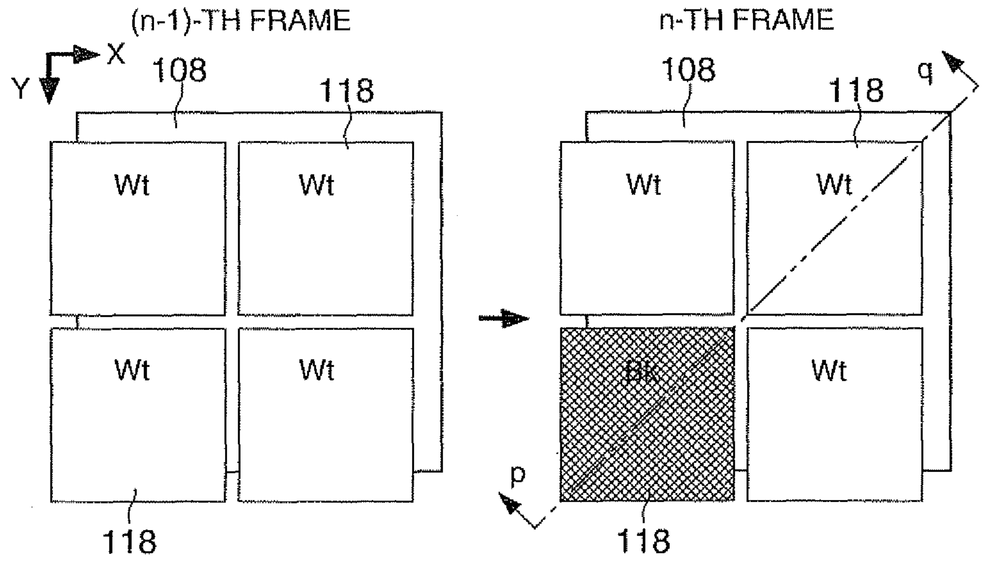
FIGS. 24A to 24C illustrate reverse tilt occurring in the liquid crystal panel.
Figure 24B:
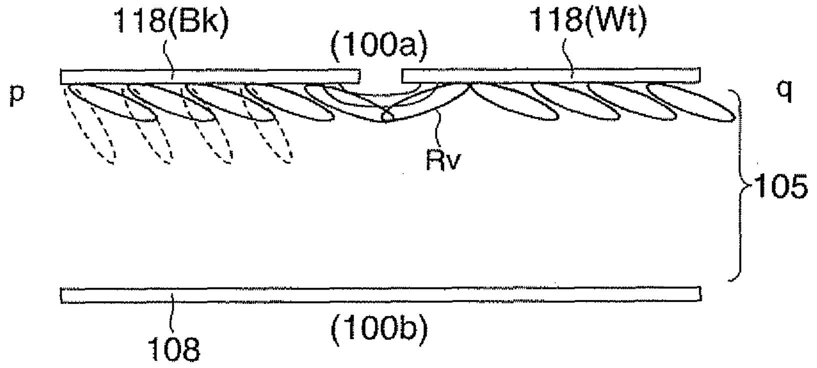
Figure 24C:
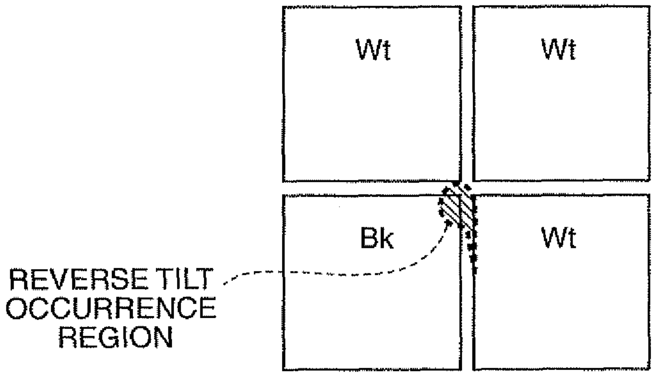

Moreover, a case in which the four (2×2) pixels transition from a state where all the four pixels are white pixels of which the liquid crystal molecules are in the unstable state in the (n−1)-th frame to a state where only one pixel on the bottom-left is a black pixel in the n-th frame as shown in FIG. 24A will be considered. Even in this transition, a horizontal electric field that is stronger than the vertical electric field generated between the pixel electrode 118 (Bk) and the common electrode 108 is generated between the pixel electrode 118 (Bk) of the black pixel and the pixel electrode 118 (Wt) of the white pixel. With this horizontal electric field, a liquid crystal molecule Rv in the white pixel close to an adjacent black pixel enters a reverse tilt state with its alignment changed earlier than other liquid crystal molecules that are going to be tilted with the vertical electric field as shown in FIG. 24B. However, since the vertical electric field intensity does not change in the white pixels from that in the (n−1)-th frame, the reverse tilt has little effect on the other liquid crystal molecule. Therefore, in the pixels that do not transition from the white pixels, a region where the reverse tilt occurs is negligibly narrow compared to the example of FIG. 23C as shown in FIG. 24C.

On the other hand, among the four (2×2) pixels, in the pixel on the bottom-left that transitions from white to black, the initial alignment direction of the liquid crystal molecules is barely affected by the horizontal electric field. Thus, even when a vertical electric field is applied, almost no liquid crystal molecule enters the reverse tilt state. Therefore, in the pixel on the bottom-left, as the vertical electric field intensity increases, the liquid crystal molecules are properly tilted in the vertical direction of the substrate surface as depicted by the broken line in FIG. 24B. As a result, the pixel transitions to an intended black pixel, and there is no deterioration in the display quality.

In a TN-mode liquid crystal operating in the normally white mode in which the tilt azimuth angle θb is 45°, (1) when an n-th frame is focused on, a dark pixel (applied voltage: high) and a bright pixel (applied voltage: low) are adjacent, namely a pixel in which the applied voltage is high and a pixel in which the applied voltage is low are adjacent so that the horizontal electric field increases; and (2) when in the n-th frame, the dark pixel (applied voltage: high) is positioned on the top-right side, the right side, or the top side with respect to the adjacent bright pixel (applied voltage: low), (3) if the liquid crystal molecules of a pixel that transitions to the dark pixel in the n-th frame, which are in the unstable state in the (n−1)-th frame one frame before the n-th frame, a reverse tilt occurs in the dark pixel in the n-th frame.

Therefore, looking at this occurrence state from a different perspective in the (n+1)-th frame, even when a dark pixel in the (n+1)-th frame is made to satisfy the above-mentioned positional relationship by the movement of the image, it may be beneficial to take an action so as to suppress the liquid crystal molecules of that pixel from entering the unstable state in the n-th frame before the transition.

Considering the fact that unlike the normally black mode, in the normally white mode, the applied voltage to the liquid crystal device decreases as the gradation level gets higher (brighter), it may be beneficial to modify the configuration of the video processing circuit 30 as follows.

That is, in the n-th frame, the third detector 325 in the video processing circuit 30 may be configured to extract a portion where a dark pixel is positioned on the bottom side thereof and a bright pixel is positioned on the top side thereof, and a portion where a dark pixel is positioned on the left side thereof and a bright pixel is positioned on the right side thereof from the applied boundary detected by the applied boundary determiner 324 and output the extracted portions as the risk boundary. The pixels of which the gradation level is corrected by the correction portion 314 based on the risk boundary are the same as those described in the first to sixth embodiments.

Although an example where the tilt azimuth angle θb of the TN-mode liquid crystal is 45° has been described, considering the fact that the occurrence direction of the reverse tilt domain in the TN mode is opposite to that of the VA mode, the actions taken for angles of the tilt azimuth angle θb other than 45° and the configurations thereof can be easily inferred from the foregoing description.

Movement Direction of Pattern

In the embodiments described above, a portion where a dark pixel and a bright pixel are adjacent in the vertical or horizontal direction was detected as a boundary. This is to enable processing of an image pattern which moves in either direction. On the other hand, with regard to a movement of a cursor or the like on a display screen of a word processor or a text editing program, it may be sufficient to consider only the horizontal (X) direction as the movement direction of the image pattern. For example, when only the horizontal direction is considered as the movement direction of the image pattern, if the tilt azimuth angle θb of the VA-mode liquid crystal is 45°, it may be beneficial to configure the first detector 321 to detect only a portion where a pixel in the gradation range a and a pixel in the gradation range b are adjacent in the vertical direction as a boundary. In this case, the boundary detector 302 does not treat a portion where the pixels are adjacent in the horizontal direction as the boundary.

When only the horizontal direction is considered as the movement direction of the image pattern as described above, it is possible to simplify the configuration compared to the configuration in which the vertical direction or the diagonal direction is also considered.

Although the case where the tilt azimuth angle θb of the VA-mode liquid crystal is 45° has been described as an example, the same applies to a case where the tilt azimuth angle θb of the VA-mode liquid crystal is 225°.

Although in the respective embodiments described above, the video signal Vid-in specifies the gradation level of a pixel, the video signal Vid-in may directly specify the applied voltage to the liquid crystal device. When the video signal Vid-in specifies the applied voltage to the liquid crystal device, the boundary may be determined based on the specified applied voltage, and the applied voltage may be corrected.

The gradation levels of the respective bright or dark pixels subjected to the correction in each of the second, fourth, and sixth embodiments may not be identical.

Moreover, in the above-described embodiments, the liquid crystal device 120 is not limited to a transmission-type liquid crystal device but may be a reflection-type liquid crystal device. Furthermore, the liquid crystal device 120 is not limited to a normally black mode but may operate in a normally white mode.

Electronic Apparatus

Figure 25:
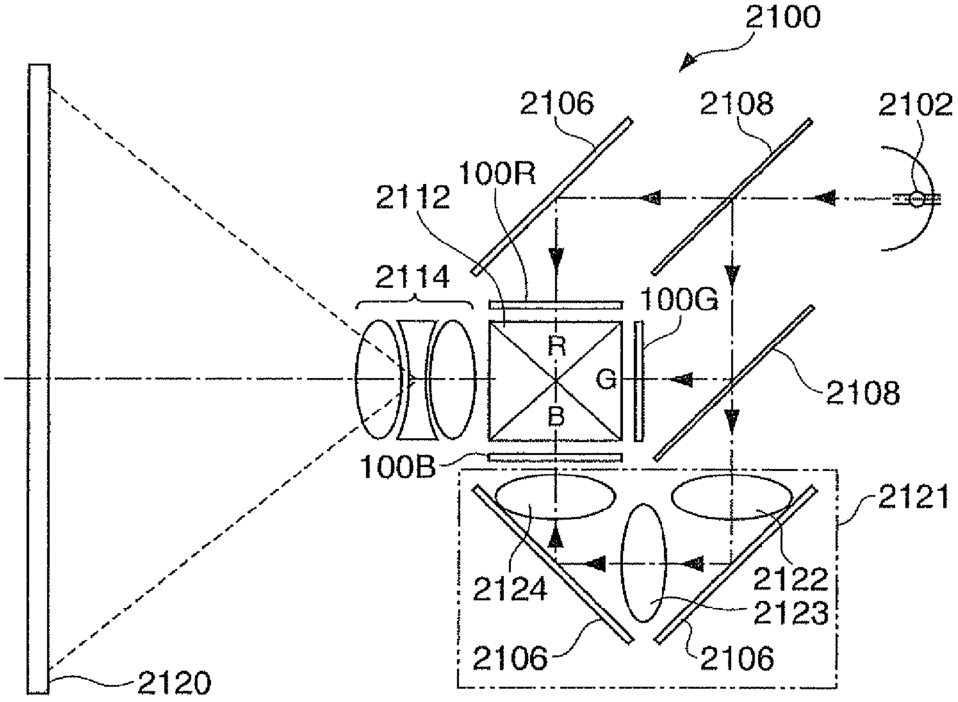
FIG. 25 shows a projector having a liquid crystal display device.

Next, a projection display apparatus (projector) using the liquid crystal panel 100 as a light valve will be described as an example of an electronic apparatus using the liquid crystal display device according to the above-described embodiment. FIG. 25 is a plan view showing the configuration of this projector.

As shown in the drawing, a lamp unit 2102 formed of a white light source such as a halogen lamp is provided inside a projector 2100. A projection light beam emitted from the lamp unit 2102 is separated into the three primary colors R (red), G (green), and B (blue) by three mirrors 2106 and two dichroic mirrors 2108 disposed in the projector 2100. The three primary color light beams are guided to the corresponding light valves 100R, 100G, and 100B. Since the B light beam passes along a longer optical path than the other R and G light beams, in order to prevent the optical loss, the B light beam is guided through a relay lens system 2121 which includes an incidence lens 2122, a relay lens 2123, and an exiting lens 2124.

In this projector 2100, three liquid crystal display devices each including the liquid crystal panel 100 are provided so as to correspond to the three colors R, G, and B. The light valves 100R, 100G, and 100B have the same configuration as the liquid crystal panel 100 described above. Video signals specifying the gradation levels of the respective primary color components R, G, and B are supplied from an external high-order circuit, whereby the light valves 100R, 100G, and 100B are driven.

Light beams modulated by the light valves 100R, 100G, and 100B enter a dichroic prism 2112 from three directions. In the dichroic prism 2112, the R and B light beams are refracted by 90°, whereas the G light beam passes straight therethrough. Thereafter, the images of the respective primary colors are combined, and a color image is projected onto a screen 2120 by a projection lens 2114.

Since the dichroic mirror 2108 causes light beams corresponding to the colors R, G, and B to enter the corresponding light valves 100R, 100G, and 100B, it is not necessary to provide a color filter. Moreover, since the transmission images of the light valves 100R and 100B are projected after being reflected by the dichroic prism 2112, whereas the transmission image of the light valve 100G is projected without being reflected, the horizontal scanning direction by the light valves 100R and 100B is opposite to the horizontal scanning direction of the light valve 100G, so that horizontally inverted images are displayed.

In addition to the projector described with reference to FIG. 25, examples of the electronic apparatus include televisions, view-finder-type or monitor-direct-view-type video tape recorders, car navigators, pagers, electronic notebooks, electronic calculators, word processors, workstations, video phones, POS terminals, digital-still cameras, portable phones, apparatuses equipped with touch panels, and the like. Moreover, it goes without saying that the liquid crystal display device can be applied to these various types of electronic apparatuses.

The entire disclosure of Japanese Patent Application No. 2010-040926, filed Feb. 25, 2010 is expressly incorporated by reference herein.

What is claimed is:

1. A video processing circuit used in a liquid crystal panel in which a liquid crystal is interposed between a first substrate on which a pixel electrode is provided so as to correspond to each of a plurality of pixels and a second substrate on which a common electrode is provided, and a liquid crystal device is formed of the pixel electrode, the liquid crystal, and the common electrode, the video processing circuit inputting video signals that specify an applied voltage to the liquid crystal device for each of the pixels and defining each of the applied voltages to the liquid crystal devices based on processed video signals, comprising:

a first boundary detector that analyzes a video signal of a present frame to detect a boundary between a first pixel of which the applied voltage specified by the video signal is lower than a first voltage and a second pixel of which the applied voltage is equal to or higher than a second voltage higher than the first voltage;

a second boundary detector that analyzes a video signal of a frame one frame before the present frame to detect a boundary between the first pixel and the second pixel;

a third boundary detector that detects a portion of the boundary detected by the first boundary detector, which is changed from the boundary detected by the second boundary detector, as a risk boundary that is determined by a tilt azimuth of the liquid crystal; and a correction portion that corrects an applied voltage to a liquid crystal device corresponding to a first pixel which is adjacent to the risk boundary detected by the third boundary detector from the applied voltage to a liquid crystal device corresponding to the first pixel to a third voltage or higher, the third voltage lower than the first voltage, when the applied voltage specified by the video signal input to the first pixel is lower than the third voltage.

2. The video processing circuit according to claim 1, wherein the correction portion corrects the applied voltages to liquid crystal devices corresponding to the first pixel adjacent to the risk boundary and one or more first pixels continuous to the first pixel from the applied voltage specified by the video signal to the third voltage or higher, and wherein when a refresh time interval of the display of the liquid crystal panel is S and a response time of the liquid crystal device when the applied voltage is changed from a voltage lower than the third voltage to the voltage corrected by the correction portion is T1, if S<T1, the number of first pixels of which the applied voltage is to be corrected is determined by the value of an integer part of a division of the response time T1 by the time interval S.

3. The video processing circuit according to claim 1, wherein the correction portion corrects the applied voltage to the liquid crystal device corresponding to the first pixel subjected to the correction to a voltage that gives an initial tilt angle to the liquid crystal device.

4. The video processing circuit according to claim 1, wherein the tilt azimuth is a direction from one end of the long axis of a liquid crystal molecule on the pixel electrode side to the other end of the liquid crystal molecule as viewed in plan view from the pixel electrode side towards the common electrode.

5. A video processing method used in a liquid crystal panel in which a liquid crystal is interposed between a first substrate on which a pixel electrode is provided so as to correspond to each of a plurality of pixels and a second substrate on which a common electrode is provided, and a liquid crystal device is formed of the pixel electrode, the liquid crystal, and the common electrode, the video processing method inputting video signals that specify an applied voltage to the liquid crystal device for each of the pixels and defining each of the applied voltages to the liquid crystal devices based on processed video signals, comprising:

detecting a boundary between a first pixel of which the applied voltage specified by an input video signal is lower than a first voltage and a second pixel of which the applied voltage is equal to or higher than a second voltage higher than the first voltage;

analyzing a video signal of a frame one frame before a present frame to detect a boundary between the first pixel and the second pixel;

detecting a portion of the boundary detected in the present frame, which is changed from the boundary detected in the frame one frame before the present frame, as a risk boundary that is determined by a tilt azimuth of the liquid crystal; and correcting an applied voltage to a liquid crystal device corresponding to a first pixel which is adjacent to the detected risk boundary from the applied voltage to a liquid crystal device corresponding to the first pixel to a third voltage or higher, the third voltage lower than the first voltage, when the applied voltage specified by the video signal input to the first pixel is lower than the third voltage.

6. A liquid crystal display device comprising:

a liquid crystal panel having a liquid crystal device in which a liquid crystal is interposed between a pixel electrode provided on a first substrate so as to correspond to each of a plurality of pixels and a common electrode provided on a second substrate; and the video processing circuit according to claim 1.

7. An electronic apparatus having the liquid crystal display device according to claim 6.

* * * * *